(12) United States Patent
Hilbert et al.

(10) Patent No.: US 10,808,185 B2
(45) Date of Patent: Oct. 20, 2020

(54) BRIGHT STOCK PRODUCTION FROM LOW SEVERITY RESID DEASPHALTING

(71) Applicant: ExxonMobil Research and Engineering Company, Annandale, NJ (US)

(72) Inventors: Timothy L. Hilbert, Middleburg, VA (US); Michael B. Carroll, Center Valley, PA (US); Ajit B. Dandekar, Clinton, NJ (US); Sara L. Yohe, Raritan, NJ (US); Stephen H. Brown, Lebanon, NJ (US); Tracie L. Owens, Houston, TX (US); April D. Ross, Conroe, TX (US); Eric B. Senzer, Margate, FL (US); Steven Pyl, Annandale, NJ (US); Rugved P. Pathare, Sarnia (CA); Lisa I-Ching Yeh, Marlton, NJ (US); Bradley R. Fingland, Mason, MI (US); Keith K. Aldous, Montgomery, TX (US); Anjaneya S. Kovvali, Fairfax, VA (US); Kendall S. Fruchey, Easton, PA (US); Sara K. Green, Flemington, NJ (US); Camden N. Henderson, Mullica Hill, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 122 days.

(21) Appl. No.: 15/390,790

(22) Filed: Dec. 27, 2016

(65) Prior Publication Data

US 2017/0183577 A1    Jun. 29, 2017

Related U.S. Application Data

(60) Provisional application No. 62/271,543, filed on Dec. 28, 2015.

(51) Int. Cl.
*C10G 67/00* (2006.01)
*C10G 67/04* (2006.01)
(Continued)

(52) U.S. Cl.
CPC .............. *C10G 67/049* (2013.01); *C01B 3/48* (2013.01); *C10G 55/02* (2013.01); *C10G 65/043* (2013.01);
(Continued)

(58) Field of Classification Search
CPC ................ C10G 67/04; C10G 67/0409; C10G 67/0436; C10G 67/0445; C10G 67/0454;
(Continued)

(56) References Cited

U.S. PATENT DOCUMENTS 1,815,022 A    7/1931 Davis
1,948,296 A    2/1934 Haylett
(Continued)

FOREIGN PATENT DOCUMENTS

CA    1094044 A    1/1981
EP    0099141 A    1/1984
(Continued)

OTHER PUBLICATIONS

The Partial International Search Report of PCT/US2016/068784 dated Mar. 17, 2017.
(Continued)

*Primary Examiner* — Prem C Singh
*Assistant Examiner* — Brandi M Doyle
(74) *Attorney, Agent, or Firm* — Scott F. Yarnell

(57) ABSTRACT

Methods are provided for forming lubricant base stocks from feeds such as vacuum resid or other 510° C.+ feeds. A feed can be deasphalted and then catalytically and/or solvent
(Continued)

processed to form lubricant base stocks, including bright stocks that are resistant to haze formation.

25 Claims, 10 Drawing Sheets

(51) Int. Cl.
| | |
|---|---|
| C10G 55/02 | (2006.01) |
| C10G 65/04 | (2006.01) |
| C10K 1/00 | (2006.01) |
| C10K 3/04 | (2006.01) |
| C10M 101/02 | (2006.01) |
| C01B 3/48 | (2006.01) |
| C10J 3/82 | (2006.01) |
| C10N 20/02 | (2006.01) |
| C10N 20/00 | (2006.01) |
| C10N 30/02 | (2006.01) |

(52) U.S. Cl.
CPC .......... *C10G 67/04* (2013.01); *C10G 67/0418* (2013.01); *C10G 67/0445* (2013.01); *C10G 67/0454* (2013.01); *C10G 67/0463* (2013.01); *C10G 67/0481* (2013.01); *C10J 3/82* (2013.01); *C10K 1/004* (2013.01); *C10K 3/04* (2013.01); *C10M 101/02* (2013.01); *C01B 2203/0283* (2013.01); *C01B 2203/065* (2013.01); *C10G 2300/1077* (2013.01); *C10G 2300/202* (2013.01); *C10G 2300/206* (2013.01); *C10G 2300/301* (2013.01); *C10G 2300/304* (2013.01); *C10G 2400/10* (2013.01); *C10J 2300/0906* (2013.01); *C10J 2300/0913* (2013.01); *C10J 2300/1618* (2013.01); *C10M 2203/1006* (2013.01); *C10M 2203/1085* (2013.01); *C10N 2020/011* (2020.05); *C10N 2020/02* (2013.01); *C10N 2030/02* (2013.01)

(58) Field of Classification Search
CPC .. C10G 67/049; C10G 67/0481; C10G 67/14; C10G 65/02; C10G 65/12; C10G 2300/206; C10G 2300/301; C10G 2400/10; C10M 101/02; C10M 2203/1006
See application file for complete search history.

(56) References Cited

U.S. PATENT DOCUMENTS

| | | | |
|---|---|---|---|
| 2,015,748 A | 10/1935 | Frolich | |
| 2,081,473 A | 5/1937 | Bray et al. | |
| 2,100,993 A | 11/1937 | Bruson | |
| 2,191,498 A | 2/1940 | Reiff | |
| 2,213,798 A | 9/1940 | Anne | |
| 2,387,501 A | 10/1945 | Dietrich | |
| 2,655,479 A | 10/1953 | Munday et al. | |
| 2,666,746 A | 1/1954 | Munday et al. | |
| 2,721,877 A | 10/1955 | Popkin et al. | |
| 2,721,878 A | 10/1955 | Popkin | |
| 2,940,920 A | 6/1960 | Leo | |
| 3,036,003 A | 5/1962 | Verdol | |
| 3,087,936 A | 4/1963 | LeSuer | |
| 3,172,892 A | 3/1965 | LeSuer et al. | |
| 3,200,107 A | 8/1965 | LeSuer | |
| 3,215,707 A | 11/1965 | Rense | |
| 3,219,666 A | 11/1965 | Norman et al. | |
| 3,250,715 A | 5/1966 | Wyman | |
| 3,254,025 A | 5/1966 | LeSuer | |
| 3,272,746 A | 9/1966 | LeSuer et al. | |
| 3,275,554 A | 9/1966 | Wagenaar | |
| 3,287,254 A | 11/1966 | Paterson | |
| 3,316,177 A | 4/1967 | Dorer, Jr. | |
| 3,322,670 A | 5/1967 | Burt et al. | |
| 3,329,658 A | 7/1967 | Fields | |
| 3,341,542 A | 9/1967 | LeSuer et al. | |
| 3,413,347 A | 11/1968 | Worrel | |
| 3,414,506 A | 12/1968 | Van Lookeren Campagne | |
| 3,438,757 A | 4/1969 | Honnen et al. | |
| 3,444,170 A | 5/1969 | Norman et al. | |
| 3,449,250 A | 6/1969 | Fields | |
| 3,454,555 A | 7/1969 | van der Voort et al. | |
| 3,454,607 A | 7/1969 | LeSuer et al. | |
| 3,519,565 A | 7/1970 | Coleman | |
| 3,541,012 A | 11/1970 | Stuebe | |
| 3,565,804 A | 2/1971 | Honnen et al. | |
| 3,595,791 A | 7/1971 | Cohen | |
| 3,627,675 A | 12/1971 | Ditman et al. | |
| 3,630,904 A | 12/1971 | Musser et al. | |
| 3,632,511 A | 1/1972 | Liao | |
| 3,652,616 A | 3/1972 | Watson et al. | |
| 3,666,730 A | 5/1972 | Coleman | |
| 3,687,849 A | 8/1972 | Abbott | |
| 3,697,574 A | 10/1972 | Piasek et al. | |
| 3,702,300 A | 11/1972 | Coleman | |
| 3,703,536 A | 11/1972 | Piasek et al. | |
| 3,704,308 A | 11/1972 | Piasek et al. | |
| 3,725,277 A | 4/1973 | Worrel | |
| 3,725,480 A | 4/1973 | Traise et al. | |
| 3,726,882 A | 4/1973 | Traise et al. | |
| 3,751,365 A | 8/1973 | Piasek et al. | |
| 3,755,433 A | 8/1973 | Miller et al. | |
| 3,756,953 A | 9/1973 | Piasek et al. | |
| 3,765,911 A | 10/1973 | Knowles et al. | |
| 3,787,374 A | 1/1974 | Adams | |
| 3,798,165 A | 3/1974 | Piasek et al. | |
| 3,803,039 A | 4/1974 | Piasek et al. | |
| 3,822,209 A | 7/1974 | Knapp et al. | |
| 3,830,723 A | 8/1974 | Ladeur et al. | |
| 3,902,988 A | 9/1975 | Bennett et al. | |
| 3,948,800 A | 4/1976 | Meinhardt | |
| 4,100,082 A | 7/1978 | Clason et al. | |
| 4,125,459 A | 11/1978 | Garwin | |
| 4,234,435 A | 11/1980 | Meinhardt et al. | |
| 4,426,305 A | 1/1984 | Malec | |
| 4,454,059 A | 6/1984 | Pindar et al. | |
| 4,686,028 A | 8/1987 | Van Driesen et al. | |
| 4,715,946 A | 12/1987 | Le Page et al. | |
| 4,767,551 A | 8/1988 | Hunt et al. | |
| 4,798,684 A | 1/1989 | Salomon | |
| 4,810,367 A | 3/1989 | Chombart et al. | |
| 4,911,821 A * | 3/1990 | Katzer | C10G 65/043 208/18 |
| 4,982,051 A | 1/1991 | Pasternak et al. | |
| 5,084,197 A | 1/1992 | Galic et al. | |
| 5,124,025 A | 6/1992 | Kolstad et al. | |
| 5,302,279 A | 4/1994 | Degnan et al. | |
| 5,358,627 A | 10/1994 | Mears et al. | |
| 5,372,703 A | 12/1994 | Kamiya et al. | |
| 5,705,458 A | 1/1998 | Roby et al. | |
| 5,871,634 A | 2/1999 | Wiehe et al. | |
| 5,976,353 A | 11/1999 | Cody et al. | |
| 6,034,039 A | 3/2000 | Gomes et al. | |
| 6,191,078 B1 | 2/2001 | Shlomo | |
| 6,241,874 B1 | 6/2001 | Wallace et al. | |
| 6,323,164 B1 | 11/2001 | Liesen et al. | |
| 6,409,912 B1 | 6/2002 | Wallace et al. | |
| 6,461,497 B1 | 10/2002 | Pedersen | |
| 6,533,925 B1 | 3/2003 | Wallace et al. | |
| 6,814,856 B1 | 11/2004 | Aussillous et al. | |
| 7,029,571 B1 | 4/2006 | Bharracharyya et al. | |
| 7,261,805 B2 | 8/2007 | Grove et al. | |
| 7,279,090 B2 | 10/2007 | Colyar et al. | |
| 7,381,321 B2 | 6/2008 | Benazzi et al. | |
| 7,513,989 B1 * | 4/2009 | Soled | B01J 23/002 208/106 |
| 7,598,426 B2 | 10/2009 | Fang et al. | |
| 7,704,930 B2 | 4/2010 | Deckman et al. | |
| 7,776,206 B2 | 8/2010 | Miller et al. | |
| 8,048,833 B2 | 11/2011 | Habeeb et al. | |
| 8,361,309 B2 | 1/2013 | Lopez et al. | |
| 8,366,908 B2 | 2/2013 | Prentice et al. | |
| 8,394,255 B2 | 3/2013 | McCarthy et al. | |

(56) References Cited

U.S. PATENT DOCUMENTS

| | | | |
|---|---|---|---|
| 8,492,321 B2 | 7/2013 | Goujon et al. | |
| 8,513,150 B2 | 8/2013 | Wu | |
| 8,541,635 B2 | 9/2013 | Landschof | |
| 8,557,106 B2 | 10/2013 | Novak et al. | |
| 8,617,383 B2 | 12/2013 | Prentice et al. | |
| 8,658,030 B2 | 2/2014 | Osaheni et al. | |
| 8,778,171 B2 | 7/2014 | Oliveri et al. | |
| 8,785,354 B2 | 7/2014 | Westelynck et al. | |
| 8,932,454 B2 | 1/2015 | Wu et al. | |
| 8,992,764 B2 | 3/2015 | Prentice et al. | |
| 9,005,380 B2 | 4/2015 | Mathur | |
| 9,035,113 B2 | 5/2015 | Lopez et al. | |
| 9,200,218 B2 | 12/2015 | Dougherty et al. | |
| 9,418,828 B2 | 8/2016 | Mennito et al. | |
| 2002/0005374 A1 | 1/2002 | Roby, Jr. et al. | |
| 2004/0094453 A1 | 5/2004 | Lok et al. | |
| 2004/0125459 A1 | 7/2004 | Tanitsu et al. | |
| 2004/0178118 A1 | 9/2004 | Rosenbaum et al. | |
| 2004/0250466 A1 | 12/2004 | Fang et al. | |
| 2005/0000857 A1* | 1/2005 | Benazzi | B01J 23/40 208/49 |
| 2005/0098476 A1 | 5/2005 | Miller | |
| 2006/0101712 A1 | 5/2006 | Burnett et al. | |
| 2006/0111599 A1 | 5/2006 | Lamprecht et al. | |
| 2006/0118463 A1 | 6/2006 | Colyar et al. | |
| 2006/0163115 A1 | 7/2006 | Montanan et al. | |
| 2007/0181461 A1 | 8/2007 | Adams et al. | |
| 2008/0149534 A1 | 6/2008 | Gauthier et al. | |
| 2008/0308459 A1 | 12/2008 | Iki et al. | |
| 2009/0294328 A1 | 12/2009 | Iqbal | |
| 2009/0313890 A1 | 12/2009 | Lopez et al. | |
| 2010/0077842 A1 | 4/2010 | Rosenbaum et al. | |
| 2011/0089080 A1 | 3/2011 | Dobrich | |
| 2011/0303585 A1 | 12/2011 | Dath et al. | |
| 2011/0315596 A1 | 12/2011 | Prentice et al. | |
| 2011/0315597 A1 | 12/2011 | Krishna et al. | |
| 2012/0000829 A1 | 1/2012 | Dougherty et al. | |
| 2013/0026418 A1 | 1/2013 | Koseoglu | |
| 2013/0048537 A1 | 2/2013 | Noh et al. | |
| 2013/0092598 A1 | 4/2013 | Joseck et al. | |
| 2013/0143778 A1* | 6/2013 | Varadaraj | C08L 95/00 508/133 |
| 2013/0146508 A1 | 6/2013 | Quignard et al. | |
| 2013/0264246 A1* | 10/2013 | Holtzer | C10G 65/12 208/19 |
| 2013/0341243 A1 | 12/2013 | Novak et al. | |
| 2014/0197071 A1 | 7/2014 | Prentice et al. | |
| 2014/0274827 A1 | 9/2014 | Lyon et al. | |
| 2015/0014217 A1 | 1/2015 | Smiley et al. | |
| 2015/0152343 A1 | 6/2015 | Vijay et al. | |
| 2015/0175911 A1 | 6/2015 | Shih et al. | |
| 2015/0218466 A1 | 8/2015 | Prentice et al. | |
| 2015/0344807 A1 | 12/2015 | Takeshima | |
| 2016/0281009 A1 | 9/2016 | Aubry et al. | |
| 2017/0183578 A1 | 6/2017 | Hilbert et al. | |
| 2017/0183579 A1 | 6/2017 | Fruchey et al. | |
| 2017/0183580 A1 | 6/2017 | Harandi et al. | |
| 2017/0211005 A1 | 7/2017 | Yeh et al. | |

FOREIGN PATENT DOCUMENTS

| | | | |
|---|---|---|---|
| EP | 0471071 B1 | 8/1995 | |
| EP | 1452579 A1 | 9/2004 | |
| GB | 1174593 A | 12/1969 | |
| GB | 1216198 A | 12/1970 | |
| GB | 1270438 A | 4/1972 | |
| GB | 1440230 A | 6/1976 | |
| JP | 2004002551 A | 1/2004 | |
| JP | 2004067906 A | 3/2004 | |
| JP | 3866380 B2 | 1/2007 | |
| JP | 2007009159 A | 1/2007 | |
| JP | 3999911 B2 | 10/2007 | |
| JP | 3999912 B2 | 10/2007 | |
| JP | 4072396 B2 | 4/2008 | |
| JP | 4152127 B2 | 9/2008 | |
| JP | 4268373 B2 | 5/2009 | |
| JP | 2009292934 A | 12/2009 | |
| JP | 4482469 B2 | 6/2010 | |
| JP | 4482470 B2 | 6/2010 | |
| JP | 2010215723 A | 9/2010 | |
| JP | 4563216 B2 | 10/2010 | |
| JP | 4567947 B2 | 10/2010 | |
| JP | 4567948 B2 | 10/2010 | |
| JP | 2010241869 A | 10/2010 | |
| JP | 2010241875 A | 10/2010 | |
| JP | 4575646 B2 | 11/2010 | |
| JP | 4593376 B2 | 12/2010 | |
| JP | 4620381 B2 | 1/2011 | |
| JP | 2012021085 A | 2/2012 | |
| JP | 4994327 B2 | 8/2012 | |
| JP | 5043754 B2 | 10/2012 | |
| JP | 5052874 B2 | 10/2012 | |
| JP | 5052875 B2 | 10/2012 | |
| JP | 5052876 B2 | 10/2012 | |
| JP | 5128631 B2 | 1/2013 | |
| JP | 5128632 B2 | 1/2013 | |
| JP | 5128633 B2 | 1/2013 | |
| JP | 2013040352 A | 2/2013 | |
| JP | 5166686 B2 | 3/2013 | |
| JP | 5205639 B2 | 6/2013 | |
| JP | 5205640 B2 | 6/2013 | |
| JP | 5205641 B2 | 6/2013 | |
| JP | 5312646 B2 | 10/2013 | |
| JP | 5328973 B2 | 10/2013 | |
| JP | 5361499 B2 | 12/2013 | |
| JP | 5467890 B2 | 4/2014 | |
| JP | 5518454 B2 | 6/2014 | |
| JP | 5520101 B2 | 6/2014 | |
| JP | 5520114 B2 | 6/2014 | |
| JP | 5520115 B2 | 6/2014 | |
| JP | 5615215 B2 | 10/2014 | |
| JP | 5632522 B2 | 11/2014 | |
| JP | 2015113405 A | 6/2015 | |
| JP | 2016008263 A | 1/2016 | |
| KR | 1566581 B1 | 11/2015 | |
| WO | 2004078885 A1 | 9/2004 | |
| WO | 2004081145 A2 | 9/2004 | |
| WO | 2004093559 A2 | 11/2004 | |
| WO | 2014175952 A1 | 10/2014 | |

OTHER PUBLICATIONS

The International Search Report and Written Opinion of PCT/US2016/068779 dated Mar. 29, 2017.

The International Search Report and Written Opinion of PCT/US2016/068786 dated Mar. 24, 2017.

The Partial International Search Report of PCT/US2016/068796 dated Mar. 21, 2017.

The Partial International Search Report of PCT/US2016/068803 dated Mar. 15, 2017.

The International Search Report and Written Opinion of PCT/US2016/068806 dated Mar. 21, 2017.

The International Search Report and Written Opinion of PCT/US2016/068784 dated Jun. 6, 2017.

The International Search Report and Written Opinion of PCT/US2016/068778 dated Jun. 12, 2017.

The International Search Report and Written Opinion of PCT/US2016/068781 dated Jun. 14, 2017.

The International Search Report and Written Opinion of PCT/US2016/068796 dated May 29, 2017.

The International Search Report and Written Opinion of PCT/US2016/068801 dated Apr. 21, 2017.

The International Search Report and Written Opinion of PCT/US2016/068803 dated Jun. 9, 2017.

Laredo, Georgina C. et al., "High quality diesel by hydrotreating of atmospheric gas oil/light cycle oil blends", Fuel, 2004, vol. 83, pp. 1381-1389.

\* cited by examiner

|   |   |   | Ref 1 | Ref 2 | Sample I | Sample II | Sample III |
|---|---|---|---|---|---|---|---|
| 2 | KV100 | cSt | 28.13 | 33.42 | 31.08 | 29.45 | 29.97 |
| 3 | KV40 | cSt | 389.6 | 435.2 | 391 | 361.3 | 383.3 |
| 4 | VI |  | 99 | 113 | 113 | 113 | 109 |
| 5 | CCR | D4530 | 0.01 | <0.01 | 0.01 | 0.01 | 0.01 |
| 6 | Pour Point | D97 | -18 | -24 | -27 | -15 | -18 |
| 7 | Cloud Point | D2500 | -18 | 6 | -10 | -2 | 6 |
| 8 | Cloud Pour Spread | D97-D2500 | 0 | 30 | 17 | 13 | 24 |
| 9 | SimDis, IBP |  | 829 | 842 | 973 | 944 | 937 |
| 10 | SimDis, 5% |  | 922 | 966 | 1044 | 1021 | 1020 |
| 11 | SimDis, 10% |  | 958 | 1009 | 1061 | 1041 | 1043 |
| 12 | SimDis, 30% |  | 1031 | 1092 | 1100 | 1086 | 1090 |
| 13 | SimDis, 50% |  | 1079 | 1133 | 1128 | 1115 | 1119 |
| 14 | SimDis, 70% |  | 1126 | 1179 | 1161 | 1150 | 1155 |
| 15 | SimDis, 90% |  | 1203 | 1263 | 1216 | 1209 | 1213 |
| 16 | SimDis, 95% |  | 1443 | 1305 | 1247 | 1242 | 1245 |
| 17 | SimDis, FBP |  | 1331 | 1382 | 1320 | 1332 | 1327 |
| 18 | Pr + Et | 13C NMR % | 1.63 | 1.53 | 2.04 | 2.04 | 1.57 |
| 19 | T/P Pr | 13C NMR % | 0.81 | 0.76 | 0.91 | 1.09 | 0.78 |
| 20 | T/P Et | 13C NMR % | 0.82 | 0.77 | 1.13 | 0.95 | 0.79 |
| 21 | (Pr + Et)/epsilon | 13C NMR | 0.127 | 0.101 | 0.161 | 0.136 | 0.090 |
| 22 | Pr/epsilon | 13C NMR | 0.063 | 0.050 | 0.072 | 0.073 | 0.045 |
| 23 | Et/epsilon | 13C NMR | 0.064 | 0.051 | 0.089 | 0.063 | 0.046 |
| 24 | Peak Heat Exchange Rate | DSC (W/g·°C) | 4.64E-03 | 6.75E-04 | 0.000423 | 0.000809 | 9.42E-04 |
| 25 | 0 Rings | FDMS - corrected % | 1.77 | | 0.03 | 0.03 | 0.03 |
| 26 | 1 Ring | FDMS - corrected % | 8.39 | | 6.62 | 6.82 | 6.57 |
| 27 | 2 Rings | FDMS - corrected % | 15.88 | | 17.65 | 17.57 | 17.38 |
| 28 | 3 Rings | FDMS - corrected % | 19.59 | | 21.53 | 21.00 | 20.65 |
| 29 | 4 Rings | FDMS - corrected % | 18.85 | | 18.65 | 18.52 | 18.68 |
| 30 | 5 Rings | FDMS - corrected % | 14.83 | | 13.33 | 13.26 | 13.91 |
| 31 | 6 Rings | FDMS - corrected % | 9.47 | | 8.21 | 8.43 | 8.72 |
| 32 | (5+6)/(2+3) | FDMS - corrected | 0.69 | | 0.55 | 0.56 | 0.59 |
| 33 | (1+2+3)/(4+5+6) | FDMS - corrected | 1.02 | | 1.14 | 1.13 | 1.08 |

FIG. 7

| | | Ref 1 | Ref 2 | Sample IV | Sample V | Sample VI | Sample II | Sample III |
|---|---|---|---|---|---|---|---|---|
| 2 KV100 | cSt | 28.13 | 33.42 | 25.73 | 26.35 | 30.23 | 30.65 | 26.57 |
| 3 KV40 | cSt | 389.6 | 435.2 | 320.99 | 336.12 | 402.5 | 416 | 336.7 |
| 4 I | | 99 | 113 | 104 | 103 | 106 | 104 | 104 |
| 5 CCR | D4530 | 0.01 | <0.01 | | | 0.03 | | |
| 6 Pour Point | D97 | -18 | -24 | | -21 | -21 | -15 | |
| 7 Cloud Point | D2500 | -18 | 6 | | 3 | 9 | 13 | |
| 8 Cloud Pour Spread | D97-D2500 | 0 | 30 | | 24 | 30 | | |
| 9 SimDis, IBP | | 829 | 842 | 746 | 768 | 865 | 831 | 753 |
| 10 SimDis, 5% | | 922 | 966 | 887 | 889 | 938 | 938 | 889 |
| 11 SimDis, 10% | | 958 | 1009 | 927 | 928 | 967 | 971 | 929 |
| 12 SimDis, 30% | | 1031 | 1092 | 1006 | 1007 | 1032 | 1040 | 1010 |
| 13 SimDis, 50% | | 1079 | 1133 | 1064 | 1065 | 1085 | 1093 | 1069 |
| 14 SimDis, 70% | | 1126 | 1179 | 1127 | 1128 | 1143 | 1150 | 1134 |
| 15 SimDis, 90% | | 1203 | 1263 | 1227 | 1229 | 1242 | 1248 | 1244 |
| 16 SimDis, 95% | | 1443 | 1305 | 1279 | 1281 | 1291 | 1296 | 1302 |
| 17 SimDis, FBP | | 1331 | 1382 | 1362 | 1358 | 1364 | 1367 | 1382 |
| 18 Pr + Et | 13C NMR | 1.63 | 1.53 | 1.81 | 1.88 | 1.71 | 1.73 | 1.59 |
| 19 T/P Pr | 13C NMR | 0.81 | 0.76 | 0.88 | 0.91 | 0.83 | 0.86 | 0.81 |
| 20 T/P Et | 13C NMR | 0.82 | 0.77 | 0.93 | 0.97 | 0.88 | 0.87 | 0.78 |
| 21 (Pr + Et)/epsilon | 13C NMR | 0.127 | 0.101 | 0.134 | 0.133 | 0.124 | 0.117 | 0.107 |
| 22 Pr/epsilon | 13C NMR | 0.063 | 0.050 | 0.065 | 0.064 | 0.060 | 0.058 | 0.055 |
| 23 Et/epsilon | 13C NMR | 0.064 | 0.051 | 0.069 | 0.069 | 0.064 | 0.059 | 0.053 |
| 24 Peak Heat Exchange Ra | DSC (W/g·°C) | 4.64E-03 | 6.75E-04 | 0.0013 | 0.00056 | 5.39E-04 | 7.82E-04 | 6.17E-04 |
| 25 0 Rings | FDMS - corrected % | 1.77 | | 1.86 | 1.47 | 2.18 | 2.37 | 1.86 |
| 26 1 Ring | FDMS - corrected % | 8.39 | | 11.90 | 13.30 | 10.31 | 10.66 | 10.66 |
| 27 2 Rings | FDMS - corrected % | 15.88 | | 20.75 | 23.32 | 18.21 | 18.26 | 19.83 |
| 28 3 Rings | FDMS - corrected % | 19.59 | | 21.97 | 22.95 | 20.83 | 20.29 | 21.87 |
| 29 4 Rings | FDMS - corrected % | 18.85 | | 17.05 | 16.25 | 18.02 | 17.59 | 17.85 |
| 30 5 Rings | FDMS - corrected % | 14.83 | | 10.90 | 9.30 | 13.08 | 12.95 | 11.90 |
| 31 6 Rings | FDMS - corrected % | 9.47 | | 6.30 | 4.30 | 8.31 | 8.37 | 7.20 |
| 32 (5+6)/(2+3) | FDMS - corrected | 0.69 | | 0.40 | 0.29 | 0.55 | 0.55 | 0.46 |
| 33 (1+2+3)/(4+5+6) | FDMS - corrected | 1.02 | | 1.59 | 2.00 | 1.25 | 1.26 | 1.42 |

FIG. 8

| Base Stock Character | Test Method | Units | Ref 1 | Sample A | Sample B | Sample C | Sample D | Sample E | Sample F | Sample G |
|---|---|---|---|---|---|---|---|---|---|---|
| 2 KV100 | | cSt | 28.13 | 30.4 | 30.4 | 32.5 | 30.8 | 30 | 31 | 31.7 |
| 3 KV40 | | cSt | 389.6 | 405.2 | 405.2 | 438.7 | 423.6 | 395.8 | 436.3 | 450.8 |
| 4 VI | | | 99 | 106 | 106 | 108 | 103 | 106 | 102 | 101 |
| 5 CCR | D4530 | wt% | 0.01 | <0.001 | 0 | 0.01 | 0.09 | 0.39 | 0.45 | |
| 6 Turbidity | | ntu | 0.53 | 2.7 | 2.86 | 4.25 | 3.56 | | | |
| 7 Pour Point | D97 | C | -18 | -33 | -27 | | -24 | -18 | -24 | -31* |
| 8 Cloud Point | D2500 | C | -18 | -14 | -14 | | -3 | 8.6* | 6* | 8.6* |
| 9 Cloud Pour Spread | D97-D2500 | C | 0 | 19 | 13 | | 21 | | | |
| 10 Total Saturates | D7419 | % | 99.6% | | | 0.997 | | | | |
| 11 SimDis, IBP | M1567 | F | 829 | 934 | 862 | 935 | 895 | 867 | 876 | 837 |
| 12 SimDis, 5% | | F | 922 | 987 | 986 | 995 | 946 | 948 | 943 | 913 |
| 13 SimDis, 10% | | F | 958 | 1008 | 1008 | 1017 | 971 | 974 | 970 | 947 |
| 14 SimDis, 30% | | F | 1031 | 1056 | 1058 | 1069 | 1031 | 1034 | 1031 | 1026 |
| 15 SimDis, 50% | | F | 1079 | 1097 | 1099 | 1113 | 1082 | 1086 | 1082 | 1086 |
| 16 SimDis, 70% | | F | 1126 | 1143 | 1146 | 1165 | 1139 | 1144 | 1139 | 1145 |
| 17 SimDis, 90% | | F | 1203 | 1226 | 1229 | 1250 | 1239 | 1244 | 1238 | 1240 |
| 18 SimDis, 95% | | F | 1443 | 1272 | 1273 | 1295 | 1288 | 1292 | 1287 | 1287 |
| 19 SimDis, FBP | | F | 1331 | 1360 | 1358 | 1365 | 1364 | 1358 | 1366 | 1360 |
| 20 Pr + Et | 13C NMR | % | 1.56 | 2.37 | 2.25 | 2.06 | 1.67 | 1.52 | 1.65 | 1.62 |
| 21 T/P Pr | 13C NMR | % | 0.74 | 1.05 | 1.00 | 0.95 | 0.69 | 0.82 | 0.84 | 0.84 |
| 22 T/P Et | 13C NMR | % | 0.82 | 1.32 | 1.25 | 1.11 | 0.98 | 0.70 | 0.81 | 0.78 |
| 23 (Pr + Et)/epsilon | 13C NMR | | 0.1 | 0.192 | 0.227 | 0.193 | 0.100 | 0.090 | 0.114 | 0.103 |
| 24 Pr/epsilon | 13C NMR | | 0.047 | 0.085 | 0.101 | 0.089 | 0.042 | 0.048 | 0.058 | 0.053 |
| 25 Et/epsilon | 13C NMR | | 0.053 | 0.107 | 0.126 | 0.104 | 0.059 | 0.041 | 0.056 | 0.050 |
| 26 epsilon | | % | 16.23 | 12.350 | 9.930 | 10.67 | 16.580 | 16.930 | 14.520 | 15.750 |

FIG. 9

| | Base Stock Character | Test Method | Units | Ref 1 | Sample A | Sample B | Sample C | Sample D | Sample E | Sample F | Sample G |
|---|---|---|---|---|---|---|---|---|---|---|---|
| 28 | 1 Ring | FTICR-MS | % | 11.34 | 13.50 | | 12.55 | 13.80 | 16.17 | 12.07 | 14.13 |
| 29 | 2 Rings | FTICR-MS | % | 18.01 | 20.07 | | 21.77 | 17.30 | 17.66 | 15.33 | 14.69 |
| 30 | 3 Rings | FTICR-MS | % | 19.70 | 20.62 | | 21.66 | 16.69 | 16.69 | 16.57 | 15.05 |
| 31 | 4 Rings | FTICR-MS | % | 17.35 | 16.49 | | 16.93 | 14.46 | 14.20 | 14.65 | 13.02 |
| 32 | 5 Rings | FTICR-MS | % | 13.44 | 11.45 | | 11.52 | 11.24 | 10.62 | 11.93 | 11.21 |
| 33 | 6 Rings | FTICR-MS | % | 8.93 | 6.82 | | 6.78 | 8.16 | 7.19 | 8.90 | 8.35 |
| 34 | 7 Rings | FTICR-MS | % | 4.79 | 3.56 | | 3.00 | 5.13 | 4.29 | 5.54 | 6.07 |
| 35 | 8 Rings | FTICR-MS | % | 2.06 | 1.80 | | 1.15 | 3.56 | 2.43 | 4.54 | 4.38 |
| 36 | 9 Rings | FTICR-MS | % | 0.35 | 0.66 | | 0.20 | 1.73 | 0.98 | 2.84 | 2.73 |
| 41 | 5+ | FTICR-MS | % | 29.66 | 24.35 | | 22.64 | 30.67 | 25.57 | 35.87 | 35.16 |
| 42 | 6+ | FTICR-MS | % | 16.22 | 12.90 | | 11.12 | 19.43 | 14.95 | 23.94 | 23.95 |
| 43 | 7+ | FTICR-MS | % | 7.29 | 6.09 | | 4.35 | 11.27 | 7.76 | 15.04 | 15.59 |
| | 8+ | FTICR-MS | % | 2.50 | 2.53 | | 1.35 | 6.14 | 3.47 | 9.50 | 9.53 |
| | 9+ | FTICR-MS | % | 0.43 | 0.73 | | 0.20 | 2.59 | 1.04 | 4.96 | 5.14 |
| 44 | 11+ | FTICR-MS | % | 0.02 | 0.00 | | 0 | 0.23 | 0.03 | 0.75 | 0.90 |
| | 5+/2 | FTICR-MS | | 1.65 | 1.21 | | 1.04 | 1.77 | 1.45 | 2.34 | 2.39 |
| 45 | 6+/2 | FTICR-MS | | 0.90 | 0.64 | | 0.51 | 1.12 | 0.85 | 1.56 | 1.63 |
| | 7+/2 | FTICR-MS | | 0.40 | 0.30 | | 0.20 | 0.65 | 0.44 | 0.98 | 1.06 |
| 46 | 0 Rings | FDMS - corrected | % | 3.24 | 3.62 | | 4.70 | 4.88 | 7.50 | | 7.33 |
| 47 | 1 Ring | FDMS - corrected | % | 10.05 | 9.08 | | 11.32 | 11.01 | 12.34 | | 12.09 |
| 48 | 2 Rings | FDMS - corrected | % | 15.64 | 17.71 | | 18.87 | 16.43 | 15.96 | | 14.51 |
| 49 | 3 Rings | FDMS - corrected | % | 19.41 | 22.05 | | 22.55 | 17.95 | 17.39 | | 14.61 |
| 50 | 4 Rings | FDMS - corrected | % | 19.38 | 19.77 | | 19.24 | 16.51 | 16.67 | | 14.48 |
| 51 | 5 Rings | FDMS - corrected | % | 15.85 | 14.25 | | 13.39 | 13.74 | 14.24 | | 13.36 |
| 52 | 6 Rings | FDMS - corrected | % | 10.29 | 9.07 | | 8.03 | 10.52 | 11.19 | | 11.32 |
| 53 | 7 Rings | FDMS - corrected | % | 3.93 | 2.59 | | 1.12 | 3.54 | 1.99 | | 3.15 |
| 54 | 8 Rings | FDMS - corrected | % | 1.83 | 1.21 | | 0.60 | 2.84 | 1.70 | | 3.61 |
| 55 | 9 Rings | FDMS - corrected | % | 0.31 | 0.59 | | 0.17 | 1.64 | 0.94 | | 2.63 |
| 56 | 9+ | FDMS - corrected | % | 0.39 | 0.66 | | 0.17 | 2.58 | 1.03 | | 5.54 |
| 57 | 6+ | FDMS - corrected | % | 16.43 | 13.53 | | 9.92 | 19.47 | 15.90 | | 23.62 |
| 58 | (2+3)/1 | FDMS - corrected | | 3.49 | 4.38 | | 3.66 | 3.12 | 2.70 | | 2.41 |
| 59 | (1+2+3)/(4+5+6) | FDMS - corrected | | 0.99 | 1.13 | | 1.30 | 1.11 | 1.09 | | 1.05 |

FIG. 10

BRIGHT STOCK PRODUCTION FROM LOW SEVERITY RESID DEASPHALTING

CROSS-REFERENCE TO RELATED APPLICATIONS

This application claims priority to U.S. Provisional Application Ser. No. 62/271,543 filed Dec. 28, 2015, which is herein incorporated by reference in its entirety.

This application is related to five (5) other co-pending non-provisional U.S. applications, filed on even date herewith, and identified by the following Attorney Docket numbers and titles: 2015EM423-US2 entitled "Bright Stock And Heavy Neutral Production From Resid Deasphalting"; 2016EM401 entitled "Bright Stock Production From Low Severity Resid Deasphalting"; 2016EM404 entitled "Bright Stock Production From Deasphalted Oil"; 2016EM402 entitled "Integrated Resid Deasphalting And Gasification" and 2016EM403 entitled "Sequential Deasphalting For Base Stock Production". Each of these co-pending US applications is hereby incorporated by references herein in their entirety.

FIELD

Systems and methods are provided for production of lubricant oil base stocks from deasphalted oils produced by low severity deasphalting of resid fractions.

BACKGROUND

Lubricant base stocks are one of the higher value products that can be generated from a crude oil or crude oil fraction. The ability to generate lubricant base stocks of a desired quality is often constrained by the availability of a suitable feedstock. For example, most conventional processes for lubricant base stock production involve starting with a crude fraction that has not been previously processed under severe conditions, such as a virgin gas oil fraction from a crude with moderate to low levels of initial sulfur content.

In some situations, a deasphalted oil formed by propane desaphalting of a vacuum resid can be used for additional lubricant base stock production. Deasphalted oils can potentially be suitable for production of heavier base stocks, such as bright stocks. However, the severity of propane deasphalting required in order to make a suitable feed for lubricant base stock production typically results in a yield of only about 30 wt % deasphalted oil relative to the vacuum resid feed.

U.S. Pat. No. 3,414,506 describes methods for making lubricating oils by hydrotreating pentane-alcohol-deasphalted short residue. The methods include performing deasphalting on a vacuum resid fraction with a deasphalting solvent comprising a mixture of an alkane, such as pentane, and one or more short chain alcohols, such as methanol and isopropyl alcohol. The deasphalted oil is then hydrotreated, followed by solvent extraction to perform sufficient VI uplift to form lubricating oils.

U.S. Pat. No. 7,776,206 describes methods for catalytically processing resids and/or deasphalted oils to form bright stock. A resid-derived stream, such as a deasphalted oil, is hydroprocessed to reduce the sulfur content to less than 1 wt % and reduce the nitrogen content to less than 0.5 wt %. The hydroprocessed stream is then fractionated to form a heavier fraction and a lighter fraction at a cut point between 1150° F.-1300° F. (620° C.-705° C.). The lighter fraction is then catalytically processed in various manners to form a bright stock.

SUMMARY

In various aspects, methods are provided for producing lubricant base stocks, such as bright stocks, from deasphalted oils generated by deasphalting with high deasphalting yield, such as by using $C_{4+}$ deasphalting solvents. The deasphalted oil yield can be at least 50 wt % relative to the feed to deasphalting, or at least 55 wt %, or at least 60 wt %, or at least 65 wt %, or at least 70 wt %, or at least 75 wt %. Group I base stocks (including bright stock) can be formed without performing a solvent extraction on the deasphalted oil. Group II and/or Group III base stocks (including bright stock) can be formed using a combination of catalytic and solvent processing.

BRIEF DESCRIPTION OF THE DRAWINGS

FIG. 7 shows properties of lubricant base stocks made from various propane deasphalted feeds and reference base stocks.

FIG. 8 shows properties of lubricant base stocks made from various butane deasphalted feeds.

FIG. 9 shows properties of lubricant base stocks made from various pentane deasphalted feeds.

FIG. 10 shows properties of lubricant base stocks made from various pentane deasphalted feeds.

DETAILED DESCRIPTION

Figure 1:
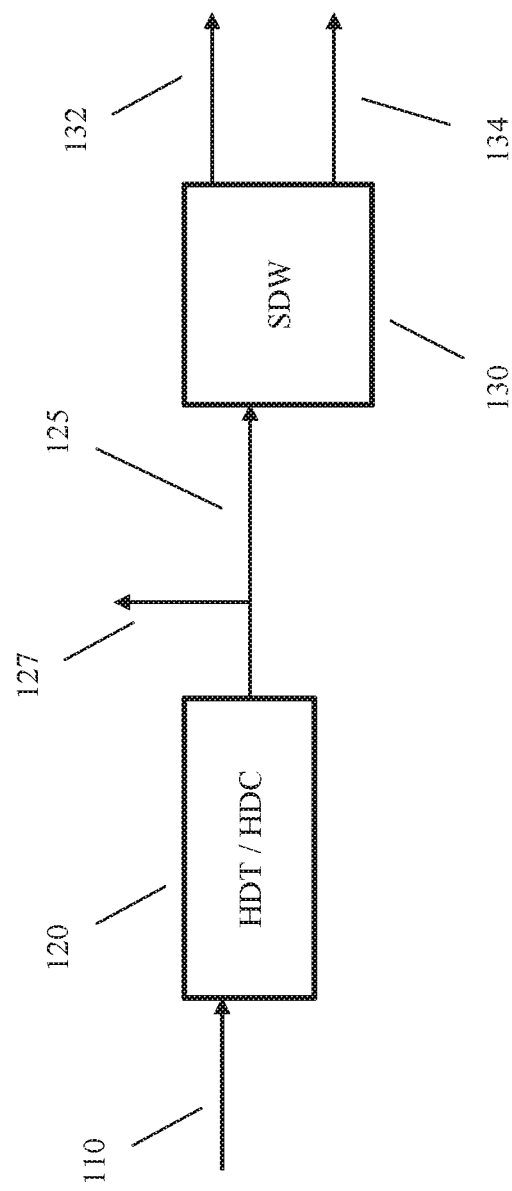
FIG. 1 schematically shows an example of a configuration for processing a deasphalted oil to form a lubricant base stock.

All numerical values within the detailed description and the claims herein are modified by "about" or "approximately" the indicated value, and take into account experimental error and variations that would be expected by a person having ordinary skill in the art.

Overview

In various aspects, methods are provided for producing Group I and Group II lubricant base stocks, including Group I and Group 11 bright stock, from deasphalted oils generated by low severity $C_{4+}$ deasphalting. Low severity deasphalting as used herein refers to deasphalting under conditions that result in a high yield of deasphalted oil (and/or a reduced amount of rejected asphalt or rock), such as a deasphalted oil yield of at least 50 wt % relative to the feed to deasphalting, or at least 55 wt %, or at least 60 wt %, or at least 65 wt %, or at least 70 wt %, or at least 75 wt %. The Group I base stocks (including bright stock) can be formed without performing a solvent extraction on the deasphalted oil. The Group II base stocks (including bright stock) can be formed using a combination of catalytic and solvent processing. In contrast with conventional bright stock produced from deasphalted oil formed at low severity conditions, the Group I and Group II bright stock described herein can be substantially free from haze after storage for extended periods of time. This haze free Group II bright stock can correspond to a bright stock with an unexpected composition.

In various additional aspects, methods are provided for catalytic processing of $C_3$ deasphalted oils to form Group II bright stock. Forming Group II bright stock by catalytic processing can provide a bright stock with unexpected compositional properties.

Conventionally, crude oils are often described as being composed of a variety of boiling ranges. Lower boiling range compounds in a crude oil correspond to naphtha or kerosene fuels. Intermediate boiling range distillate compounds can be used as diesel fuel or as lubricant base stocks. If any higher boiling range compounds are present in a crude oil, such compounds are considered as residual or "resid" compounds, corresponding to the portion of a crude oil that is left over after performing atmospheric and/or vacuum distillation on the crude oil.

In some conventional processing schemes, a resid fraction can be deasphalted, with the deasphalted oil used as part of a feed for forming lubricant base stocks. In conventional processing schemes a deasphalted oil used as feed for forming lubricant base stocks is produced using propane deasphalting. This propane deasphalting corresponds to a "high severity" deasphalting, as indicated by a typical yield of deasphalted oil of about 40 wt % or less, often 30 wt % or less, relative to the initial resid fraction. In a typical lubricant base stock production process, the deasphalted oil can then be solvent extracted to reduce the aromatics content, followed by solvent dewaxing to form a base stock. The low yield of deasphalted oil is based in part on the inability of conventional methods to produce lubricant base stocks from lower severity deasphalting that do not form haze over time.

In some aspects, it has been discovered that using a mixture of catalytic processing, such as hydrotreatment, and solvent processing, such as solvent dewaxing, can be used to produce lubricant base stocks from deasphalted oil while also producing base stocks that have little or no tendency to form haze over extended periods of time. The deasphalted oil can be produced by deasphalting process that uses a $C_4$ solvent, a $C_5$ solvent, a $C_{6+}$, solvent, a mixture of two or more $C_{4+}$ solvents, or a mixture of two or more $C_{5+}$ solvents. The deasphalting process can further correspond to a process with a yield of deasphalted oil of at least 50 wt % for a vacuum resid feed having a T10 distillation point (or optionally a T5 distillation point) of at least 510° C., or a yield of at least 60 wt %, or at least 65 wt %, or at least 70 wt %. It is believed that the reduced haze formation is due in part to the reduced or minimized differential between the pour point and the cloud point for the base stocks and/or due in part to forming a bright stock with a cloud point of −5° C. or less.

For production of Group I base stocks, a deasphalted oil can be hydroprocessed (hydrotreated and/or hydrocracked) under conditions sufficient to achieve a desired viscosity index increase for resulting base stock products. The hydroprocessed effluent can be fractionated to separate lower boiling portions from a lubricant base stock boiling range portion. The lubricant base stock boiling range portion can then be solvent dewaxed to produce a dewaxed effluent. The dewaxed effluent can be separated to form a plurality of base stocks with a reduced tendency (such as no tendency) to form haze over time.

For production of Group II base stocks, in some aspects a deasphalted oil can be hydroprocessed (hydrotreated and/or hydrocracked), so that ~700° F.+ (370° C.+) conversion is 10 wt % to 40 wt %. The hydroprocessed effluent can be fractionated to separate lower boiling portions from a lubricant base stock boiling range portion. The lubricant boiling range portion can then be hydrocracked, dewaxed, and hydrofinished to produce a catalytically dewaxed effluent. Optionally but preferably, the lubricant boiling range portion can be underdewaxed, so that the wax content of the catalytically dewaxed heavier portion or potential bright stock portion of the effluent is at least 6 wt %, or at least 8 wt %, or at least 10 wt %. This underdewaxing can also be suitable for forming light or medium or heavy neutral lubricant base stocks that do not require further solvent upgrading to form haze free base stocks. In this discussion, the heavier portion/potential bright stock portion can roughly correspond to a 538° C.+ portion of the dewaxed effluent. The catalytically dewaxed heavier portion of the effluent can then be solvent dewaxed to form a solvent dewaxed effluent. The solvent dewaxed effluent can be separated to form a plurality of base stocks with a reduced tendency (such as no tendency) to form haze over time, including at least a portion of a Group II bright stock product.

For production of Group II base stocks, in other aspects a deasphalted oil can be hydroprocessed (hydrotreated and/or hydrocracked), so that 370° C.+ conversion is at least 40 wt %, or at least 50 wt %. The hydroprocessed effluent can be fractionated to separate lower boiling portions from a lubricant base stock boiling range portion. The lubricant base stock boiling range portion can then be hydrocracked, dewaxed, and hydrofinished to produce a catalytically dewaxed effluent. The catalytically dewaxed effluent can then be solvent extracted to form a raffinate. The raffinate can be separated to form a plurality of base stocks with a reduced tendency (such as no tendency) to form haze over time, including at least a portion of a Group II bright stock product.

In other aspects, it has been discovered that catalytic processing can be used to produce Group II bright stock with unexpected compositional properties from $C_3$, $C_4$, $C_5$, and/or $C_{5+}$ deasphalted oil. The deasphalted oil can be hydrotreated to reduce the content of heteroatoms (such as sulfur and nitrogen), followed by catalytic dewaxing under sweet conditions. Optionally, hydrocracking can be included as part of the sour hydrotreatment stage and/or as part of the sweet dewaxing stage.

In various aspects, a variety of combinations of catalytic and/or solvent processing can be used to form lubricant base stocks, including Group II bright stock, from deasphalted oils. These combinations include, but are not limited to:

a) Hydroprocessing of a deasphalted oil under sour conditions (i.e., sulfur content of at least 500 wppm); separation of the hydroprocessed effluent to form at least a lubricant boiling range fraction; and solvent dewaxing of the lubricant boiling range fraction. In some aspects, the hydroprocessing of the deasphalted oil can correspond to hydrotreatment, hydrocracking, or a combination thereof.

b) Hydroprocessing of a deasphalted oil under sour conditions (i.e., sulfur content of at least 500 wppm); separation of the hydroprocessed effluent to form at least a lubricant boiling range fraction; and catalytic dewaxing of the lubricant boiling range fraction under sweet conditions (i.e., 500 wppm or less sulfur). The catalytic dewaxing can optionally correspond to catalytic dewaxing using a dewaxing catalyst with a pore size greater than 8.4 Angstroms. Optionally, the sweet processing conditions can further include hydrocracking, noble metal hydrotreatment, and/or hydrofinishing. The optional hydrocracking, noble metal hydrotreatment, and/or hydrofinishing can occur prior to and/or after or after catalytic dewaxing. For example, the order of catalytic processing under sweet processing conditions can be noble metal hydrotreating followed by hydrocracking followed by catalytic dewaxing.

c) The process of b) above, followed by performing an additional separation on at least a portion of the catalytically dewaxed effluent. The additional separation can correspond to solvent dewaxing, solvent extraction (such as solvent extraction with furfural or n-methylpyrollidone), a physical separation such as ultracentrifugation, or a combination thereof.

d) The process of a) above, followed by catalytic dewaxing (sweet conditions) of at least a portion of the solvent dewaxed product. Optionally, the sweet processing conditions can further include hydrotreating (such as noble metal hydrotreating), hydrocracking and/or hydrofinishing. The additional sweet hydroprocessing can be performed prior to and/or after the catalytic dewaxing.

Group 1 base stocks or base oils are defined as base stocks with less than 90 wt % saturated molecules and/or at least 0.03 wt % sulfur content. Group I base stocks also have a viscosity index (VI) of at least 80 but less than 120. Group II base stocks or base oils contain at least 90 wt % saturated molecules and less than 0.03 wt % sulfur. Group II base stocks also have a viscosity index of at least 80 but less than 120. Group III base stocks or base oils contain at least 90 wt % saturated molecules and less than 0.03 wt % sulfur, with a viscosity index of at least 120.

In some aspects, a Group III base stock as described herein may correspond to a Group III+ base stock. Although a generally accepted definition is not available, a Group III+ base stock can generally correspond to a base stock that satisfies the requirements for a Group III base stock while also having at least one property that is enhanced relative to a Group III specification. The enhanced property can correspond to, for example, having a viscosity index that is substantially greater than the required specification of 120, such as a Group III base stock having a VI of at least 130, or at least 135, or at least 140. Similarly, in some aspects, a Group II base stock as described herein may correspond to a Group II+ base stock. Although a generally accepted definition is not available, a Group II+ base stock can generally correspond to a base stock that satisfies the requirements for a Group II base stock while also having at least one property that is enhanced relative to a Group II specification. The enhanced property can correspond to, for example, having a viscosity index that is substantially greater than the required specification of 80, such as a Group II base stock having a VI of at least 103, or at least 108, or at least 113.

In the discussion below, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In this discussion, conditions may be provided for various types of hydroprocessing of feeds or effluents. Examples of hydroprocessing can include, but are not limited to, one or more of hydrotreating, hydrocracking, catalytic dewaxing, and hydrofinishing/aromatic saturation. Such hydroprocessing conditions can be controlled to have desired values for the conditions (e.g., temperature, pressure, LHSV, treat gas rate) by using at least one controller, such as a plurality of controllers, to control one or more of the hydroprocessing conditions. In some aspects, for a given type of hydroprocessing, at least one controller can be associated with each type of hydroprocessing condition. In some aspects, one or more of the hydroprocessing conditions can be controlled by an associated controller. Examples of structures that can be controlled by a controller can include, but are not limited to, valves that control a flow rate, a pressure, or a combination thereof; heat exchangers and/or heaters that control a temperature, and one or more flow meters and one or more associated valves that control relative flow rates of at least two flows. Such controllers can optionally include a controller feedback loop including at least a processor, a detector for detecting a value of a control variable (e.g., temperature, pressure, flow rate, and a processor output for controlling the value of a manipulated variable (e.g., changing the position of a valve, increasing or decreasing the duty cycle and/or temperature for a heater). Optionally, at least one hydroprocessing condition for a given type of hydroprocessing may not have an associated controller.

In this discussion, unless otherwise specified a lubricant boiling range fraction corresponds to a fraction having an initial boiling point or alternatively a T5 boiling point of at least about 370° C. (~700° F.). A distillate fuel boiling range fraction, such as a diesel product fraction, corresponds to a fraction having a boiling range from about 193° C. (375° F.) to about 370° C. (~700° F.). Thus, distillate fuel boiling range fractions (such as distillate fuel product fractions) can have initial boiling points (or alternatively T5 boiling points) of at least about 193° C. and final boiling points (or alternatively T95 boiling points) of about 370° C. or less. A naphtha boiling range fraction corresponds to a fraction having a boiling range from about 36° C. (122° F.) to about 193° C. (375° F.) to about 370° C. (~700° F.). Thus, naphtha fuel product fractions can have initial boiling points (or alternatively T5 boiling points) of at least about 36° C. and final boiling points (or alternatively T95 boiling points) of about 193° C. or less. It is noted that 36° C. roughly corresponds to a boiling point for the various isomers of a C5 alkane. A fuels boiling range fraction can correspond to a distillate fuel boiling range fraction, a naphtha boiling range fraction, or a fraction that includes both distillate fuel boiling range and naphtha boiling range components. Light ends are defined as products with boiling points below about 36° C., which include various C1-C4 compounds. When determining a boiling point or a boiling range for a feed or product fraction, an appropriate ASTM test method can be used, such as the procedures described in ASTM D2887. D2892, and/or D86. Preferably, ASTM D2887 should be used unless a sample is not appropriate for characterization based on ASTM D2887. For example, for samples that will not completely elute from a chromatographic column, ASTM D7169 can be used.

Feedstocks

In various aspects, at least a portion of a feedstock for processing as described herein can correspond to a vacuum resid fraction or another type 950° F.+ (510° C.+) or 1000° F.+ (538° C.+) fraction. Another example of a method for forming a 950° F.+ (510° C.+) or 1000° F.+ (538° C.+) fraction is to perform a high temperature flash separation. The 950° F.+ (510° C.+) or 1000° F.+(538° C.+) fraction formed from the high temperature flash can be processed in a manner similar to a vacuum resid.

A vacuum resid fraction or a 950° F.+ (510° C.+) fraction formed by another process (such as a flash fractionation bottoms or a bitumen fraction) can be deasphalted at low severity to form a deasphalted oil. Optionally, the feedstock can also include a portion of a conventional feed for lubricant base stock production, such as a vacuum gas oil.

A vacuum resid (or other 510° C.+) fraction can correspond to a fraction with a T5 distillation point (ASTM D2892, or ASTM D7169 if the fraction will not completely elute from a chromatographic system) of at least about 900° F. (482° C.), or at least 950° F. (510° C.), or at least 1000° F. (538° C.). Alternatively, a vacuum resid fraction can be characterized based on a T10 distillation point (ASTM D2892/D7169) of at least about 900° F. (482° C.), or at least 950° F. (510° C.), or at least 1000° F. (538° C.).

Resid (or other 510° C.+) fractions can be high in metals. For example, a resid fraction can be high in total nickel, vanadium and iron contents. In an aspect, a resid fraction can contain at least 0.00005 grams of NiN/Fe (50 wppm) or at least 0.0002 grams of NiN/Fe (200 wppm) per gram of resid, on a total elemental basis of nickel, vanadium and iron. In other aspects, the heavy oil can contain at least 500 wppm of nickel, vanadium, and iron, such as up to 1000 wppm or more.

Contaminants such as nitrogen and sulfur are typically found in resid (or other 510° C.+) fractions, often in organically-bound form. Nitrogen content can range from about 50 wppm to about 10,000 wppm elemental nitrogen or more, based on total weight of the resid fraction. Sulfur content can range from 500 wppm to 100,000 wppm elemental sulfur or more, based on total weight of the resid fraction, or from 1000 wppm to 50,000 wppm, or from 1000 wppm to 30,000 wppm.

Still another method for characterizing a resid (or other 510° C.+) fraction is based on the Conradson carbon residue (CCR) of the feedstock. The Conradson carbon residue of a resid fraction can be at least about 5 wt %, such as at least about 10 wt % or at least about 20 wt %. Additionally or alternatively, the Conradson carbon residue of a resid fraction can be about 50 wt % or less, such as about 40 wt % or less or about 30 wt % or less.

In some aspects, a vacuum gas oil fraction can be co-processed with a deasphalted oil. The vacuum gas oil can be combined with the deasphalted oil in various amounts ranging from 20 parts (by weight) deasphalted oil to 1 part vacuum gas oil (i.e., 20:1) to 1 part deasphalted oil to 1 part vacuum gas oil. In some aspects, the ratio of deasphalted oil to vacuum gas oil can be at least 1:1 by weight, or at least 1.5:1, or at least 2:1. Typical (vacuum) gas oil fractions can include, for example, fractions with a T5 distillation point to T95 distillation point of 650° F. (343° C.)-1050° F. (566° C.), or 650° F. (343° C.)-1000° F. (538° C.), or 650° F. (343° C.)-950° F. (510° C.), or 650° F. (343° C.)-900° F. (482° C.), or ~700° F. (370° C.)-1050° F. (566° C.), or ~700°F. (370° C.)-1000° F. (538° C.), or ~700° F. (370° C.)-950° F. (510° C.), or ~700° F. (370° C.)-900° F. (482° C.), or 750° F. (399° C.)-1050° F. (566° C.), or 750° F. (399° C.)-1000° F. (538° C.), or 750° F. (399° C.)-950° F. (510° C.), or 750° F. (399° C.)-900° F. (482° C.). For example a suitable vacuum gas oil fraction can have a T5 distillation point of at least 343° C. and a T95 distillation point of 566° C. or less; or a T10 distillation point of at least 343° C. and a T90 distillation point of 566° C. or less; or a T5 distillation point of at least 370° C. and a T95 distillation point of 566° C. or less; or a T5 distillation point of at least 343° C. and a T95 distillation point of 538° C. or less.

Solvent Deasphalting

Solvent deasphalting is a solvent extraction process. In some aspects, suitable solvents for methods as described herein include alkanes or other hydrocarbons (such as alkenes) containing 4 to 7 carbons per molecule. Examples of suitable solvents include n-butane, isobutane, n-pentane, $C_{4+}$ alkanes, $C_{5+}$ alkanes, $C_{4+}$ hydrocarbons, and $C_{5+}$ hydrocarbons. In other aspects, suitable solvents can include $C_3$ hydrocarbons, such as propane. In such other aspects, examples of suitable solvents include propane, n-butane, isobutane, n-pentane, $C_{3+}$ alkanes, $C_{4+}$ alkanes, $C_{5+}$ alkanes, $C_{3+}$ hydrocarbons, $C_{4+}$ hydrocarbons, and $C_{5+}$ hydrocarbons In this discussion, a solvent comprising $C_n$ (hydrocarbons) is defined as a solvent composed of at least 80 wt % of alkanes (hydrocarbons) having n carbon atoms, or at least 85 wt %, or at least 90 wt %, or at least 95 wt %, or at least 98 wt %. Similarly, a solvent comprising $C_{n+}$ (hydrocarbons) is defined as a solvent composed of at least 80 wt % of alkanes (hydrocarbons) having n or more carbon atoms, or at least 85 wt %, or at least 90 wt %, or at least 95 wt %, or at least 98 wt %.

In this discussion, a solvent comprising $C_n$ alkanes (hydrocarbons) is defined to include the situation where the solvent corresponds to a single alkane (hydrocarbon) containing n carbon atoms (for example, n=3, 4, 5, 6, 7) as well as the situations where the solvent is composed of a mixture of alkanes (hydrocarbons) containing n carbon atoms. Similarly, a solvent comprising $C_{n+}$ alkanes (hydrocarbons) is defined to include the situation where the solvent corresponds to a single alkane (hydrocarbon) containing n or more carbon atoms (for example, n=3, 4, 5, 6, 7) as well as the situations where the solvent corresponds to a mixture of alkanes (hydrocarbons) containing n or more carbon atoms. Thus, a solvent comprising $C_{4+}$ alkanes can correspond to a solvent including n-butane; a solvent include n-butane and isobutane; a solvent corresponding to a mixture of one or more butane isomers and one or more pentane isomers; or any other convenient combination of alkanes containing 4 or more carbon atoms. Similarly, a solvent comprising $C_{5+}$ alkanes (hydrocarbons) is defined to include a solvent corresponding to a single alkane (hydrocarbon) or a solvent corresponding to a mixture of alkanes (hydrocarbons) that contain 5 or more carbon atoms. Alternatively, other types of solvents may also be suitable, such as supercritical fluids. In various aspects, the solvent for solvent deasphalting can consist essentially of hydrocarbons, so that at least 98 wt % or at least 99 wt % of the solvent corresponds to compounds containing only carbon and hydrogen. In aspects where the deasphalting solvent corresponds to a $C_{4+}$ deasphalting solvent, the $C_{4+}$ deasphalting solvent can include less than 15 wt % propane and/or other $C_3$ hydrocarbons, or less than 10 wt %, or less than 5 wt %, or the $C_{4+}$ deasphalting solvent can be substantially free of propane and/or other $C_3$ hydrocarbons (less than 1 wt %). In aspects where the deasphalting solvent corresponds to a $C_{5+}$ deasphalting solvent, the $C_{5+}$ deasphalting solvent can include less than 15 wt % propane, butane and/or other $C_3$-$C_4$ hydrocarbons, or less than 10 wt %, or less than 5 wt %, or the $C_{5+}$ deasphalting solvent can be substantially free of propane, butane, and/or other $C_3$-$C_4$ hydrocarbons (less than 1 wt %). In aspects where the deasphalting solvent corresponds to a $C_{3+}$ deasphalting solvent, the $C_{3+}$ deasphalting solvent can include less than 10 wt % ethane and/or other $C_2$ hydrocarbons, or less than 5 wt %, or the $C_{3+}$ deasphalting solvent can be substantially free of ethane and/or other $C_2$ hydrocarbons (less than 1 wt %).

Deasphalting of heavy hydrocarbons, such as vacuum resids, is known in the art and practiced commercially. A deasphalting process typically corresponds to contacting a heavy hydrocarbon with an alkane solvent (propane, butane, pentane, hexane, heptane etc and their isomers), either in pure form or as mixtures, to produce two types of product streams. One type of product stream can be a deasphalted oil extracted by the alkane, which is further separated to produce deasphalted oil stream. A second type of product stream can be a residual portion of the feed not soluble in the solvent, often referred to as rock or asphaltene fraction. The deasphalted oil fraction can be further processed into make fuels or lubricants. The rock fraction can be further used as blend component to produce asphalt, fuel oil, and/or other products. The rock fraction can also be used as feed to gasification processes such as partial oxidation, fluid bed combustion or coking processes. The rock can be delivered to these processes as a liquid (with or without additional components) or solid (either as pellets or lumps).

During solvent deasphalting, a resid boiling range feed (optionally also including a portion of a vacuum gas oil feed) can be mixed with a solvent. Portions of the feed that are soluble in the solvent are then extracted, leaving behind a residue with little or no solubility in the solvent. The portion of the deasphalted feedstock that is extracted with the solvent is often referred to as deasphalted oil. Typical solvent deasphalting conditions include mixing a feedstock fraction with a solvent in a weight ratio of from about 1:2 to about 1:10, such as about 1:8 or less. Typical solvent deasphalting temperatures range from 40° C. to 200° C. or 40° C. to 150° C., depending on the nature of the feed and the solvent. The pressure during solvent deasphalting can be from about 50 psig (345 kPag) to about 500 psig (3447 kPag).

It is noted that the above solvent deasphalting conditions represent a general range, and the conditions will vary depending on the feed. For example, under typical deasphalting conditions, increasing the temperature can tend to reduce the yield while increasing the quality of the resulting deasphalted oil. Under typical deasphalting conditions, increasing the molecular weight of the solvent can tend to increase the yield while reducing the quality of the resulting deasphalted oil, as additional compounds within a resid fraction may be soluble in a solvent composed of higher molecular weight hydrocarbons. Under typical deasphalting conditions, increasing the amount of solvent can tend to increase the yield of the resulting deasphalted oil. As understood by those of skill in the art, the conditions for a particular feed can be selected based on the resulting yield of deasphalted oil from solvent deasphalting. In aspects where a $C_3$ deasphalting solvent is used, the yield from solvent deasphalting can be 40 wt % or less. In some aspects, $C_4$ deasphalting can be performed with a yield of deasphalted oil of 50 wt % or less, or 40 wt % or less. In various aspects, the yield of deasphalted oil from solvent deasphalting with a $C_{4+}$ solvent can be at least 50 wt % relative to the weight of the feed to deasphalting, or at least 55 wt %, or at least 60 wt % or at least 65 wt %, or at least 70 wt %. In aspects where the feed to deasphalting includes a vacuum gas oil portion, the yield from solvent deasphalting can be characterized based on a yield by weight of a 950° F.+ (510° C.) portion of the deasphalted oil relative to the weight of a 510° C.+ portion of the feed. In such aspects where a $C_{4+}$ solvent is used, the yield of 510° C.+ deasphalted oil from solvent deasphalting can be at least 40 wt % relative to the weight of the 510° C.+ portion of the feed to deasphalting, or at least 50 wt %, or at least 55 wt %, or at least 60 wt % or at least 65 wt %, or at least 70 wt %. In such aspects where a $C_{4-}$ solvent is used, the yield of 510° C.+ deasphalted oil from solvent deasphalting can be 50 wt % or less relative to the weight of the 510° C.+ portion of the feed to deasphalting, or 40 wt % or less, or 35 wt % or less.

Hydrotreating and Hydrocracking

After deasphalting, the deasphalted oil (and any additional fractions combined with the deasphalted oil) can undergo further processing to form lubricant base stocks. This can include hydrotreatment and/or hydrocracking to remove heteroatoms to desired levels, reduce Conradson Carbon content, and/or provide viscosity index (VI) uplift. Depending on the aspect, a deasphalted oil can be hydroprocessed by hydrotreating, hydrocracking, or hydrotreating and hydrocracking.

The deasphalted oil can be hydrotreated and/or hydrocracked with little or no solvent extraction being performed prior to and/or after the deasphalting. As a result, the deasphalted oil feed for hydrotreatment and/or hydrocracking can have a substantial aromatics content. In various aspects, the aromatics content of the deasphalted oil feed can be at least 50 wt %, or at least 55 wt %, or at least 60 wt %, or at least 65 wt %, or at least 70 wt %, or at least 75 wt %, such as up to 90 wt % or more. Additionally or alternately, the saturates content of the deasphalted oil feed can be 50 wt % or less, or 45 wt % or less, or 40 wt % or less, or 35 wt % or less, or 30 wt % or less, or 25 wt % or less, such as down to 10 wt % or less. In this discussion and the claims below, the aromatics content and/or the saturates content of a fraction can be determined based on ASTM D7419.

The reaction conditions during demetallization and/or hydrotreatment and/or hydrocracking of the deasphalted oil (and optional vacuum gas oil co-feed) can be selected to generate a desired level of conversion of a feed. Any convenient type of reactor, such as fixed bed (for example trickle bed) reactors can be used. Conversion of the feed can be defined in terms of conversion of molecules that boil above a temperature threshold to molecules below that threshold. The conversion temperature can be any convenient temperature, such as ~700° F. (370° C.) or 1050° F. (566° C.). The amount of conversion can correspond to the total conversion of molecules within the combined hydrotreatment and hydrocracking stages for the deasphalted oil. Suitable amounts of conversion of molecules boiling above 1050° F. (566° C.) to molecules boiling below 566° C. include 30 wt % to 90 wt % conversion relative to 566° C., or 30 wt % to 80 wt %, or 30 wt % to 70 wt %, or 40 wt % to 90 wt %, or 40 wt % to 80 wt %, or 40 wt % to 70 wt %, or 50 wt % to 90 wt %, or 50 wt % to 80 wt %, or 50 wt % to 70 wt %. In particular, the amount of conversion relative to 566° C. can be 30 wt % to 90 wt %, or 30 wt % to 70 wt %, or 50 wt % to 90 wt %. Additionally or alternately, suitable amounts of conversion of molecules boiling above ~700° F. (370° C.) to molecules boiling below 370° C. include 10 wt % to 70 wt % conversion relative to 370° C., or 10 wt % to 60 wt %, or 10 wt % to 50 wt %, or 20 wt % to 70 wt %, or 20 wt % to 60 wt %, or 20 wt % to 50 wt %, or 30 wt % to 70 wt %, or 30 wt % to 60 wt %, or 30 wt % to 50 wt %. In particular, the amount of conversion relative to 370° C. can be 10 wt % to 70 wt %, or 20 wt % to 50 wt %, or 30 wt % to 60 wt %.

The hydroprocessed deasphalted oil can also be characterized based on the product quality. After hydroprocessing (hydrotreating and/or hydrocracking), the hydroprocessed deasphalted oil can have a sulfur content of 200 wppm or less, or 100 wppm or less, or 50 wppm or less (such as down to ~0 wppm). Additionally or alternately, the hydroprocessed deasphalted oil can have a nitrogen content of 200 wppm or less, or 100 wppm or less, or 50 wppm or less (such as down to ~0 wppm). Additionally or alternately, the hydroprocessed deasphalted oil can have a Conradson Carbon residue content of 1.5 wt % or less, or 1.0 wt % or less, or 0.7 wt % or less, or 0.1 wt % or less, or 0.02 wt % or less (such as down to ~0 wt %). Conradson Carbon residue content can be determined according to ASTM D4530.

In various aspects, a feed can initially be exposed to a demetallization catalyst prior to exposing the feed to a hydrotreating catalyst. Deasphalted oils can have metals concentrations (Ni+V+Fe) on the order of 10-100 wppm. Exposing a conventional hydrotreating catalyst to a feed having a metals content of 10 wppm or more can lead to catalyst deactivation at a faster rate than may desirable in a commercial setting. Exposing a metal containing feed to a demetallization catalyst prior to the hydrotreating catalyst can allow at least a portion of the metals to be removed by the demetallization catalyst, which can reduce or minimize the deactivation of the hydrotreating catalyst and/or other subsequent catalysts in the process flow. Commercially available demetallization catalysts can be suitable, such as large pore amorphous oxide catalysts that may optionally include Group VI and/or Group VIII non-noble metals to provide some hydrogenation activity.

In various aspects, the deasphalted oil can be exposed to a hydrotreating catalyst under effective hydrotreating conditions. The catalysts used can include conventional hydroprocessing catalysts, such as those comprising at least one Group VIII non-noble metal (Columns 8-10 of IUPAC periodic table), preferably Fe, Co, and/or Ni, such as Co and/or Ni, and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 m$^2$/g, or 150 to 250 m$^2$/g; and a pore volume of from 0.25 to 1.0 cm$^3$/g, or 0.35 to 0.8 cm$^3$/g. More generally, any convenient size, shape, and/or pore size distribution for a catalyst suitable for hydrotreatment of a distillate (including lubricant base stock) boiling range feed in a conventional manner may be used. Preferably, the support or carrier material is an amorphous support, such as a refractory oxide. Preferably, the support or carrier material can be free or substantially free of the presence of molecular sieve, where substantially free of molecular sieve is defined as having a content of molecular sieve of less than about 0.01 wt %.

The at least one Group VIII non-noble metal, in oxide form, can typically be present in an amount ranging from about 2 wt % to about 40 wt %, preferably from about 4 wt % to about 15 wt %. The at least one Group VI metal, in oxide form, can typically be present in an amount ranging from about 2 wt % to about 70 wt %, preferably for supported catalysts from about 6 wt % to about 40 wt % or from about 10 wt % to about 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this invention, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane). The treat gas stream introduced into a reaction stage will preferably contain at least about 50 vol. % and more preferably at least about 75 vol. % hydrogen. Optionally, the hydrogen treat gas can be substantially free (less than 1 vol %) of impurities such as $H_2S$ and $NH_3$ and/or such impurities can be substantially removed from a treat gas prior to use.

Hydrogen can be supplied at a rate of from about 100 SCF/B (standard cubic feet of hydrogen per barrel of feed) (17 Nm$^3$/m$^3$) to about 10000 SCF/B (1700 Nm$^3$/m$^3$). Preferably, the hydrogen is provided in a range of from about 200 SCF/B (34 Nm$^3$/m$^3$) to about 2500 SCF/B (420 Nm$^3$/m$^3$). Hydrogen can be supplied co-currently with the input feed to the hydrotreatment reactor and/or reaction zone or separately via a separate gas conduit to the hydrotreatment zone.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); liquid hourly space velocities (LHSV) of 0.1 hr$^{-1}$ to 10 hr$^{-1}$; and hydrogen treat rates of 200 scfB (35.6 m$^3$/m$^3$) to 10.000 scf/B (1781 m$^3$/m$^3$), or 500 (89 m$^3$/m$^3$) to 10,000 scf/B (1781 m$^3$/m$^3$).

In various aspects, the deasphalted oil can be exposed to a hydrocracking catalyst under effective hydrocracking conditions. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.30 Angstroms or less. Additionally or alternately, the catalyst can be a low acidity molecular sieve, such as a USY zeolite with a Si to Al ratio of at least about 20, and preferably at least about 40 or 50. ZSM-48, such as ZSM-48 with a $SiO_2$ to $Al_2O_3$ ratio of about 110 or less, such as about 90 or less, is another example of a potentially suitable hydrocracking catalyst. Still another option is to use a combination of USY and ZSM-48. Still other options include using one or more of zeolite Beta, ZSM-5, ZSM-35, or ZSM-23, either alone or in combination with a USY catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

When only one hydrogenation metal is present on a hydrocracking catalyst, the amount of that hydrogenation metal can be at least about 0.1 wt % based on the total weight of the catalyst, for example at least about 0.5 wt % or at least about 0.6 wt %. Additionally or alternately when only one hydrogenation metal is present, the amount of that hydrogenation metal can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Further additionally or alternately when more than one hydrogenation metal is present, the collective amount of hydrogenation metals can be at least about 0.1 wt % based on the total weight of the catalyst, for example at least about 0.25 wt %, at least about 0.5 wt %, at least about 0.6 wt %, at least about 0.75 wt %, or at least about 1 wt %. Still further additionally or alternately when more than one hydrogenation metal is present, the collective amount of hydrogenation metals can be about 35 wt % or less based on the total weight of the catalyst, for example about 30 wt % or less, about 25 wt % or less, about 20 wt % or less, about 15 wt % or less, about 10 wt % or less, or about 5 wt % or less. In embodiments wherein the supported metal comprises a noble metal, the amount of noble metal(s) is typically less than about 2 wt %, for example less than about 1 wt %, about 0.9 wt % or less, about 0.75 wt % or less, or about 0.6 wt % or less. It is noted that hydrocracking under sour conditions is typically performed using a base metal (or metals) as the hydrogenation metal.

In various aspects, the conditions selected for hydrocracking for lubricant base stock production can depend on the desired level of conversion, the level of contaminants in the input feed to the hydrocracking stage, and potentially other factors. For example, hydrocracking conditions in a single stage, or in the first stage and/or the second stage of a multi-stage system, can be selected to achieve a desired level of conversion in the reaction system. Hydrocracking conditions can be referred to as sour conditions or sweet conditions, depending on the level of sulfur and/or nitrogen present within a feed. For example, a feed with 100 wppm or less of sulfur and 50 wppm or less of nitrogen, preferably less than 25 wppm sulfur and/or less than 10 wppm of nitrogen, represent a feed for hydrocracking under sweet conditions. In various aspects, hydrocracking can be performed on a thermally cracked resid, such as a deasphalted oil derived from a thermally cracked resid. In some aspects, such as aspects where an optional hydrotreating step is used prior to hydrocracking, the thermally cracked resid may correspond to a sweet feed. In other aspects, the thermally cracked resid may represent a feed for hydrocracking under sour conditions.

A hydrocracking process under sour conditions can be carried out at temperatures of about 550° F. (288° C.) to about 840° F. (449° C.), hydrogen partial pressures of from about 1500 psig to about 5000 psig (10.3 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 $m^3/m^3$ to about 1068 $m^3/m^3$ (1200 SCF/B to 6000 SCF/B). The LHSV can be from about 0.25 $h^{-1}$ to about 50 $h^{-1}$, or from about 0.5 $h^{-1}$ to about 20 $h^{-1}$, preferably from about 1.0 $h^{-1}$ to about 4.0 $h^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as about 350° F. (177° C.) or about 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least about 350° F. (177° C.) or at least about 400° F. (204° C.) to having an upper end cut point temperature of about 700° F. (371° C.) or less or 650° F. (343° C.) or less. Optionally, the distillate fuel range can be extended to include additional kerosene, such as by selecting a lower end cut point temperature of at least about 300° F. (149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base stocks. In such aspects, the portion boiling above the distillate fuel range is subjected to further hydroprocessing in a second hydroprocessing stage.

A hydrocracking process under sweet conditions can be performed under conditions similar to those used for a sour hydrocracking process, or the conditions can be different. In an embodiment, the conditions in a sweet hydrocracking stage can have less severe conditions than a hydrocracking process in a sour stage. Suitable hydrocracking conditions for a non-sour stage can include, but are not limited to, conditions similar to a first or sour stage. Suitable hydrocracking conditions can include temperatures of about 500° F. (260° C.) to about 840° F. (449° C.), hydrogen partial pressures of from about 1500 psig to about 5000 psig (10.3 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 h$^{-1}$ to about 50 h$^{-1}$, or from about 0.5 h$^{-1}$ to about 20 h$^{-1}$, preferably from about 1.0 h$^{-1}$ to about 4.0 h$^{-1}$.

In still another aspect, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

In yet another aspect, a hydroprocessing reaction system may include more than one hydrocracking stage. If multiple hydrocracking stages are present, at least one hydrocracking stage can have effective hydrocracking conditions as described above, including a hydrogen partial pressure of at least about 1500 psig (10.3 MPag). In such an aspect, other hydrocracking processes can be performed under conditions that may include lower hydrogen partial pressures. Suitable hydrocracking conditions for an additional hydrocracking stage can include, but are not limited to, temperatures of about 500° F. (260° C.) to about 840° F. (449° C.), hydrogen partial pressures of from about 250 psig to about 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions for an additional hydrocracking stage can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 h$^{-1}$ to about 50 h$^{-1}$, or from about 0.5 h$^{-1}$ to about 20 h$^{-1}$, and preferably from about 1.0 h$^{-1}$ to about 4.0 h$^{-1}$.

Hydroprocessed Effluent—Solvent Dewaxing to Form Group I Bright Stock

The hydroprocessed deasphalted oil (optionally including hydroprocessed vacuum gas oil) can be separated to form one or more fuel boiling range fractions (such as naphtha or distillate fuel boiling range fractions) and at least one lubricant base stock boiling range fraction. The lubricant base stock boiling range fraction(s) can then be solvent dewaxed to produce a lubricant base stock product with a reduced (or eliminated) tendency to form haze. Lubricant base stocks (including bright stock) formed by hydroprocessing a deasphalted oil and then solvent dewaxing the hydroprocessed effluent can tend to be Group I base stocks due to having an aromatics content of at least 10 wt %.

Solvent dewaxing typically involves mixing a feed with chilled dewaxing solvent to form an oil-solvent solution. Precipitated wax is thereafter separated by, for example, filtration. The temperature and solvent are selected so that the oil is dissolved by the chilled solvent while the wax is precipitated.

An example of a suitable solvent dewaxing process involves the use of a cooling tower where solvent is pre-chilled and added incrementally at several points along the height of the cooling tower. The oil-solvent mixture is agitated during the chilling step to permit substantially instantaneous mixing of the prechilled solvent with the oil. The prechilled solvent is added incrementally along the length of the cooling tower so as to maintain an average chilling rate at or below 10° F. per minute, usually between about 1 to about 5° F. per minute. The final temperature of the oil-solvent/precipitated wax mixture in the cooling tower will usually be between 0 and 50° F. (−17.8 to 10° C.). The mixture may then be sent to a scraped surface chiller to separate precipitated wax from the mixture.

Representative dewaxing solvents are aliphatic ketones having 3-6 carbon atoms such as methyl ethyl ketone and methyl isobutyl ketone, low molecular weight hydrocarbons such as propane and butane, and mixtures thereof. The solvents may be mixed with other solvents such as benzene, toluene or xylene.

In general, the amount of solvent added will be sufficient to provide a liquid/solid weight ratio between the range of 5/1 and 20/1 at the dewaxing temperature and a solvent/oil volume ratio between 1.5/1 to 5/1. The solvent dewaxed oil can be dewaxed to a pour point of −6° C. or less, or −10° C. or less, or −15° C. or less, depending on the nature of the target lubricant base stock product. Additionally or alternately, the solvent dewaxed oil can be dewaxed to a cloud point of −2° C. or less, or −5° C. or less, or −10° C. or less, depending on the nature of the target lubricant base stock product. The resulting solvent dewaxed oil can be suitable for use in forming one or more types of Group I base stocks. Preferably, a bright stock formed from the solvent dewaxed oil can have a cloud point below −5° C. The resulting solvent dewaxed oil can have a viscosity index of at least 90, or at least 95, or at least 100. Preferably, at least 10 wt % of the resulting solvent dewaxed oil (or at least 20 wt %, or at least 30 wt %) can correspond to a Group 1 bright stock having a kinematic viscosity at 100° C. of at least 15 cSt, or at least 20 cSt, or at least 25 cSt, such as up to 50 cSt or more.

In some aspects, the reduced or eliminated tendency to form haze for the lubricant base stocks formed from the solvent dewaxed oil can be demonstrated by a reduced or minimized difference between the cloud point temperature and pour point temperature for the lubricant base stocks. In various aspects, the difference between the cloud point and pour point for the resulting solvent dewaxed oil and/or for one or more lubricant base stocks, including one or more bright stocks, formed from the solvent dewaxed oil, can be 22° C. or less, or 20° C. or less, or 15° C. or less, or 10° C. or less, or 8° C. or less, or 5° C. or less. Additionally or alternately, a reduced or minimized tendency for a bright stock to form haze over time can correspond to a bright stock having a cloud point of −10° C. or less, or −8° C. or less, or −5° C. or less, or −2° C. or less.

Additional Hydroprocessing—Catalytic Dewaxing, Hydrofinishing, and Optional Hydrocracking In some alternative aspects, at least a lubricant boiling range portion of the hydroprocessed deasphalted oil can be exposed to further hydroprocessing (including catalytic dewaxing) to form either Group I and/or Group II base stocks, including Group I and/or Group II bright stock. In some aspects, a first lubricant boiling range portion of the hydroprocessed deasphalted oil can be solvent dewaxed as described above while a second lubricant boiling range portion can be exposed to further hydroprocessing. In other aspects, only solvent dewaxing or only further hydroprocessing can be used to treat a lubricant boiling range portion of the hydroprocessed deasphalted oil.

Optionally, the further hydroprocessing of the lubricant boiling range portion of the hydroprocessed deasphalted oil can also include exposure to hydrocracking conditions before and/or after the exposure to the catalytic dewaxing conditions. At this point in the process, the hydrocracking can be considered "sweet" hydrocracking, as the hydroprocessed deasphalted oil can have a sulfur content of 200 wppm or less.

Suitable hydrocracking conditions can include exposing the feed to a hydrocracking catalyst as previously described above. Optionally, it can be preferable to use a USY zeolite with a silica to alumina ratio of at least 30 and a unit cell size of less than 24.32 Angstroms as the zeolite for the hydrocracking catalyst, in order to improve the VI uplift from hydrocracking and/or to improve the ratio of distillate fuel yield to naphtha fuel yield in the fuels boiling range product.

Suitable hydrocracking conditions can also include temperatures of about 500° F. (260° C.) to about 840° F. (449° C.), hydrogen partial pressures of from about 1500 psig to about 5000 psig (10.3 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 $m^3/m^3$ to about 1068 $m^3/m^3$ (1200 SCF/B to 6000 SCF/B). The LHSV can be from about 0.25 $h^{-1}$ to about 50 $h^{-1}$, or from about 0.5 $h^{-1}$ to about 20 $h^{-1}$, and preferably from about 1.0 $h^{-1}$ to about 4.0 $h^{-1}$.

For catalytic dewaxing, suitable dewaxing catalysts can include molecular sieves such as crystalline aluminosilicates (zeolites). In an embodiment, the molecular sieve can comprise, consist essentially of, or be ZSM-22, ZSM-23, ZSM-48. Optionally but preferably, molecular sieves that are selective for dewaxing by isomerization as opposed to cracking can be used, such as ZSM-48, ZSM-23, or a combination thereof. Additionally or alternately, the molecular sieve can comprise, consist essentially of, or be a 10-member ring 1-D molecular sieve, such as EU-2, EU-11, ZBM-30, ZSM-48, or ZSM-23. ZSM-48 is most preferred. Note that a zeolite having the ZSM-23 structure with a silica to alumina ratio of from about 20:1 to about 40:1 can sometimes be referred to as SSZ-32. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

Preferably, the dewaxing catalysts used in processes according to the invention are catalysts with a low ratio of silica to alumina. For example, for ZSM-48, the ratio of silica to alumina in the zeolite can be about 100:1 or less, such as about 90:1 or less, or about 75:1 or less, or about 70:1 or less. Additionally or alternately, the ratio of silica to alumina in the ZSM-48 can be at least about 50:1, such as at least about 60:1, or at least about 65:1.

In various embodiments, the catalysts according to the invention further include a metal hydrogenation component. The metal hydrogenation component is typically a Group VI and/or a Group VIII metal. Preferably, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.5 wt %, or at least 1.0 wt %, or at least 2.5 wt %, or at least 5.0 wt %, based on catalyst. The amount of metal in the catalyst can be 20 wt % or less based on catalyst, or 10 wt % or less, or 5 wt % or less, or 2.5 wt % or less, or 1 wt % or less. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts useful in processes according to the invention can also include a binder. In some embodiments, the dewaxing catalysts used in process according to the invention are formulated using a low surface area binder, a low surface area binder represents a binder with a surface area of 100 $m^2/g$ or less, or 80 $m^2/g$ or less, or 70 $m^2/g$ or less. Additionally or alternately, the binder can have a surface area of at least about 25 $m^2/g$. The amount of zeolite in a catalyst formulated using a binder can be from about 30 wt % zeolite to 90 wt % zeolite relative to the combined weight of binder and zeolite. Preferably, the amount of zeolite is at least about 50 wt % of the combined weight of zeolite and binder, such as at least about 60 wt % or from about 65 wt % to about 80 wt %.

Without being bound by any particular theory, it is believed that use of a low surface area binder reduces the amount of binder surface area available for the hydrogenation metals supported on the catalyst. This leads to an increase in the amount of hydrogenation metals that are supported within the pores of the molecular sieve in the catalyst.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt % or 0.2 to 2 wt %, or 0.3 to 1 wt %.

Effective conditions for catalytic dewaxing of a feedstock in the presence of a dewaxing catalyst can include a temperature of from 280° C. to 450° C., preferably 343° C. to 435° C., a hydrogen partial pressure of from 3.5 MPag to 34.6 MPag (500 psig to 5000 psig), preferably 4.8 MPag to 20.8 MPag, and a hydrogen circulation rate of from 178 $m^3/m^3$ (1000 SCF/B) to 1781 $m^3/m^3$ (10,000 scf/B), preferably 213 $m^3/m^3$ (1200 SCF/B) to 1068 $m^3/m^3$ (6000

SCF/B). The LHSV can be from about 0.2 h$^{-1}$ to about 10 h$^{-1}$, such as from about 0.5 h$^{-1}$ to about 5 h$^{-1}$ and/or from about 1 h$^{-1}$ to about 4 h$^{-1}$.

Before and/or after catalytic dewaxing, the hydroprocessed deasphalted oil (i.e., at least a lubricant boiling range portion thereof) can optionally be exposed to an aromatic saturation catalyst, which can alternatively be referred to as a hydrofinishing catalyst. Exposure to the aromatic saturation catalyst can occur either before or after fractionation. If aromatic saturation occurs after fractionation, the aromatic saturation can be performed on one or more portions of the fractionated product. Alternatively, the entire effluent from the last hydrocracking or dewaxing process can be hydrofinished and/or undergo aromatic saturation.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is about 30 wt. % or greater based on catalyst. For supported hydrotreating catalysts, suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as about 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41.

Hydrofinishing conditions can include temperatures from about 125° C. to about 425° C., preferably about 180° C. to about 280° C., a hydrogen partial pressure from about 500 psig (3.4 MPa) to about 3000 psig (20.7 MPa), preferably about 1500 psig (10.3 MPa) to about 2500 psig (17.2 MPa), and liquid hourly space velocity from about 0.1 hr$^{-1}$ to about 5 hr$^{-1}$ LHSV, preferably about 0.5 hr$^{-1}$ to about 1.5 hr$^{-1}$. Additionally, a hydrogen treat gas rate of from 35.6 m$^3$/m$^3$ to 1781 m$^3$/m$^3$ (200 SCF/B to 10,000 SCF/B) can be used.

Solvent Processing of Catalytically Dewaxed Effluent or Input Flow to Catalytic Dewaxing For deasphalted oils derived from propane deasphalting, the further hydroprocessing (including catalytic dewaxing) can be sufficient to form lubricant base stocks with low haze formation and unexpected compositional properties. For deasphalted oils derived from C$_{4+}$ deasphalting, after the further hydroprocessing (including catalytic dewaxing), the resulting catalytically dewaxed effluent can be solvent processed to form one or more lubricant base stock products with a reduced or eliminated tendency to form haze. The type of solvent processing can be dependent on the nature of the initial hydroprocessing (hydrotreatment and/or hydrocracking) and the nature of the further hydroprocessing (including dewaxing).

In aspects where the initial hydroprocessing is less severe, corresponding to 10 wt % to 40 wt % conversion relative to ~700° F. (370° C.), the subsequent solvent processing can correspond to solvent dewaxing. The solvent dewaxing can be performed in a manner similar to the solvent dewaxing described above. However, this solvent dewaxing can be used to produce a Group II lubricant base stock. In some aspects, when the initial hydroprocessing corresponds to 10 wt % to 40 wt % conversion relative to 370° C., the catalytic dewaxing during further hydroprocessing can also be performed at lower severity, so that at least 6 wt % wax remains in the catalytically dewaxed effluent, or at least 8 wt %, or at least 10 wt %, or at least 12 wt %, or at least 15 wt %, such as up to 20 wt %. The solvent dewaxing can then be used to reduce the wax content in the catalytically dewaxed effluent by 2 wt % to 10 wt %. This can produce a solvent dewaxed oil product having a wax content of 0.1 wt % to 12 wt %, or 0.1 wt % to 10 wt %, or 0.1 wt % to 8 wt %, or 0.1 wt % to 6 wt %, or 1 wt % to 12 wt %, or 1 wt % to 10 wt %, or 1 wt % to 8 wt %, or 4 wt % to 12 wt %, or 4 wt % to 10 wt %, or 4 wt % to 8 wt %, or 6 wt % to 12 wt %, or 6 wt % to 10 wt %. In particular, the solvent dewaxed oil can have a wax content of 0.1 wt % to 12 wt %, or 0.1 wt % to 6 wt %, or 1 wt % to 10 wt %, or 4 wt % to 12 wt %.

In other aspects, the subsequent solvent processing can correspond to solvent extraction. Solvent extraction can be used to reduce the aromatics content and/or the amount of polar molecules. The solvent extraction process selectively dissolves aromatic components to form an aromatics-rich extract phase while leaving the more paraffinic components in an aromatics-poor raffinate phase. Naphthenes are distributed between the extract and raffinate phases. Typical solvents for solvent extraction include phenol, furfural and N-methyl pyrrolidone. By controlling the solvent to oil ratio, extraction temperature and method of contacting distillate to be extracted with solvent, one can control the degree of separation between the extract and raffinate phases. Any convenient type of liquid-liquid extractor can be used, such as a counter-current liquid-liquid extractor. Depending on the initial concentration of aromatics in the deasphalted oil, the raffinate phase can have an aromatics content of 5 wt % to 25 wt %. For typical feeds, the aromatics contents can be at least 10 wt %.

Optionally, the raffinate from the solvent extraction can be under-extracted. In such aspects, the extraction is carried out under conditions such that the raffinate yield is maximized while still removing most of the lowest quality molecules from the feed. Raffinate yield may be maximized by controlling extraction conditions, for example, by lowering the solvent to oil treat ratio and/or decreasing the extraction temperature. In various aspects, the raffinate yield from solvent extraction can be at least 40 wt %, or at least 50 wt %, or at least 60 wt %, or at least 70 wt %.

The solvent processed oil (solvent dewaxed or solvent extracted) can have a pour point of –6° C. or less, or –10° C. or less, or –15° C. or less, or –20° C. or less, depending on the nature of the target lubricant base stock product. Additionally or alternately, the solvent processed oil (solvent dewaxed or solvent extracted) can have a cloud point of –2° C. or less, or –5° C. or less, or –10° C. or less, depending on the nature of the target lubricant base stock product. Pour points and cloud points can be determined according to ASTM D97 and ASTM D2500, respectively. The resulting solvent processed oil can be suitable for use in forming one or more types of Group II base stocks. The resulting solvent dewaxed oil can have a viscosity index of at least 80, or at least 90, or at least 95, or at least 100, or at least 110, or at least 120. Viscosity index can be determined according to ASTM D2270. Preferably, at least 10 wt % of the resulting solvent processed oil (or at least 20 wt %, or at least 30 wt %) can correspond to a Group II bright stock having a kinematic viscosity at 100° C. of at least 14 cSt, or at least 15 cSt, or at least 20 cSt, or at least 25 cSt, or at least 30 cSt, or at least 32 cSt, such as up to 50 cSt or more. Additionally or alternately, the Group II bright stock can have a kinematic viscosity at 40° C. of at least 300 cSt, or at least 320 cSt, or at least 340 cSt, or at least 350 cSt, such as up to 500 cSt or more. Kinematic viscosity can be determined according to ASTM D445. Additionally or alternately, the Conradson Carbon residue content can be about 0.1 wt % or less, or about 0.02 wt % or less. Conradson Carbon residue content can be determined according to ASTM D4530. Additionally or alternately, the resulting base stock can have a turbidity of at least 1.5 (in combination with a cloud point of less than 0° C.), or can have a turbidity of at least 2.0, and/or can have a turbidity of 4.0 or less, or 3.5 or less, or 3.0 or less. In particular, the turbidity can be 1.5 to 4.0, or 1.5 to 3.0, or 2.0 to 4.0, or 2.0 to 3.5.

The reduced or eliminated tendency to form haze for the lubricant base stocks formed from the solvent processed oil can be demonstrated by the reduced or minimized difference between the cloud point temperature and pour point temperature for the lubricant base stocks. In various aspects, the difference between the cloud point and pour point for the resulting solvent dewaxed oil and/or for one or more Group II lubricant base stocks, including one or more bright stocks, formed from the solvent processed oil, can be 22° C. or less, or 20° C. or less, or 15° C. or less, or 10° C. or less, such as down to about 1° C. of difference.

In some alternative aspects, the above solvent processing can be performed prior to catalytic dewaxing.

Group II Base Stock Products

For deasphalted oils derived from propane, butane, pentane, hexane and higher or mixtures thereof, the further hydroprocessing (including catalytic dewaxing) and potentially solvent processing can be sufficient to form lubricant base stocks with low haze formation (or no haze formation) and novel compositional properties. Traditional products manufactured today with kinematic viscosity of about 32 cSt at 100° C. contain aromatics that are >10% and/or sulfur that is >0.03% of the base oil.

In various aspects, base stocks produced according to methods described herein can have a kinematic viscosity of at least 14 cSt, or at least 20 cSt, or at least 25 cSt, or at least 30 cSt, or at least 32 cSt at 100° C. and can contain less than 10 wt % aromatics/greater than 90 wt % saturates and less than 0.03% sulfur. Optionally, the saturates content can be still higher, such as greater than 95 wt %, or greater than 97 wt %. In addition, detailed characterization of the branchiness (branching) of the molecules by C-NMR reveals a high degree of branch points as described further below in the examples. This can be quantified by examining the absolute number of methyl branches, or ethyl branches, or propyl branches individually or as combinations thereof. This can also be quantified by looking at the ratio of branch points (methyl, ethyl, or propyl) compared to the number of internal carbons, labeled as epsilon carbons by C-NMR. This quantification of branching can be used to determine whether a base stock will be stable against haze formation over time. For $^{13}$C-NMR results reported herein, samples were prepared to be 25-30 wt % in $CDCl_3$ with 7% Chromium (III)-acetylacetonate added as a relaxation agent. $^{13}$C NMR experiments were performed on a JEOL ECS NMR spectrometer for which the proton resonance frequency is 400 MHz. Quantitative $^{13}$C NMR experiments were performed at 27° C. using an inverse gated decoupling experiment with a 450 flip angle, 6.6 seconds between pulses, 64 K data points and 2400 scans. All spectra were referenced to TMS at 0 ppm. Spectra were processed with 0.2-1 Hz of line broadening and baseline correction was applied prior to manual integration. The entire spectrum was integrated to determine the mole % of the different integrated areas as follows: 170-190 PPM (aromatic C); 30-29.5 PPM (epsilon carbons); 15-14.5 PPM (terminal and pendant propyl groups) 14.5-14 PPM—Methyl at the end of a long chain (alpha); 12-10 PPM (pendant and terminal ethyl groups). Total methyl content was obtained from proton NMR. The methyl signal at 0-1.1 PPM was integrated. The entire spectrum was integrated to determine the mole % of methyls. Average carbon numbers obtained from gas chromatography were used to convert mole % methyls to total methyls.

Also unexpected in the composition is the discovery using Fourier Transform Ion Cyclotron Resonance—Mass Spectrometry (FTICR-MS) and/or Field Desorption Mass Spectrometry (FDMS) that the prevalence of smaller naphthenic ring structures below 6 or below 7 or below 8 naphthene rings can be similar but the residual numbers of larger naphthenic rings structures with 7 or more rings or 8+ rings or 9+ rings or 10+ rings is diminished in base stocks that are stable against haze formation.

For FTICR-MS results reported herein, the results were generated according to the method described in U.S. Pat. No. 9,418,828. The method described in U.S. Pat. No. 9,418,828 generally involves using laser desorption with Ag ion complexation (LDI-Ag) to ionize petroleum saturates molecules (including 538° C.+ molecules) without fragmentation of the molecular ion structure. Ultra-high resolution Fourier Transform Ion Cyclotron Resonance Mass Spectrometry is applied to determine exact elemental formula of the saturates-Ag cations and corresponding abundances. The saturates fraction composition can be arranged by homologous series and molecular weights. The portion of U.S. Pat. No. 9,418,828 related to determining the content of saturate ring structures in a sample is incorporated herein by reference.

For FDMS results reported herein, Field desorption (FD) is a soft ionization method in which a high-potential electric field is applied to an emitter (a filament from which tiny "whiskers" have formed) that has been coated with a diluted sample resulting in the ionization of gaseous molecules of the analyte. Mass spectra produced by FD are dominated by molecular radical cations $M^+$ or in some cases protonated molecular ions $[M+H]^+$. Because FDMS cannot distinguish between molecules with 'n' naphthene rings and molecules with 'n+7' rings, the FDMS data was "corrected" by using the FTICR-MS data from the most similar sample. The FDMS correction was performed by applying the resolved ratio of "n" to "n+7" rings from the FTICR-MS to the unresolved FDMS data for that particular class of molecules. Hence, the FDMS data is shown as "corrected" in the figures.

Base oils of the compositions described above have further been found to provide the advantage of being haze free upon initial production and remaining haze free for extended periods of time. This is an advantage over the prior art of high saturates heavy base stocks that was unexpected.

Additionally, it has been found that these base stocks can be blended with additives to form formulated lubricants, such as but not limited to marine oils, engine oils, greases, paper machine oils, and gear oils. These additives may include, but are not restricted to, detergents, dispersants, antioxidants, viscosity modifiers, and pour point depressants. More generally, a formulated lubricating including a base stock produced from a deasphalted oil may additionally contain one or more of the other commonly used lubricating oil performance additives including but not limited to anti-wear agents, dispersants, other detergents, corrosion inhibitors, rust inhibitors, metal deactivators, extreme pressure additives, anti-seizure agents, wax modifiers, viscosity index improvers, viscosity modifiers, fluid-loss additives, seal compatibility agents, friction modifiers, lubricity agents, anti-staining agents, chromophoric agents, defoamants, demulsifiers, emulsifiers, densifiers, wetting agents, gelling agents, tackiness agents, colorants, and others. For a review of many commonly used additives, see Klamann in Lubricants and Related Products, Verlag Chemie, Deerfield Beach, Fla.; ISBN 0-89573-177-0. These additives are commonly delivered with varying amounts of diluent oil, that may range from 5 weight percent to 50 weight percent.

When so blended, the performance as measured by standard low temperature tests such as the Mini-Rotary Viscometer (MRV) and Brookfield test has been shown to be superior to formulations blended with traditional base oils.

It has also been found that the oxidation performance, when blended into industrial oils using common additives such as, but not restricted to, defoamants, pour point depressants, antioxidants, rust inhibitors, has exemplified superior oxidation performance in standard oxidation tests such as the US Steel Oxidation test compared to traditional base stocks.

Other performance parameters such as interfacial properties, deposit control, storage stability, and toxicity have also been examined and are similar to or better than traditional base oils.

In addition to being blended with additives, the base stocks described herein can also be blended with other base stocks to make a base oil. These other base stocks include solvent processed base stocks, hydroprocessed base stocks, synthetic base stocks, base stocks derived from Fisher-Tropsch processes, PAO, and naphthenic base stocks. Additionally or alternately, the other base stocks can include Group I base stocks. Group II base stocks, Group III base stocks, Group IV base stocks, and/or Group V base stocks. Additionally or alternately, still other types of base stocks for blending can include hydrocarbyl aromatics, alkylated aromatics, esters (including synthetic and/or renewable esters), and or other non-conventional or unconventional base stocks. These base oil blends of the inventive base stock and other base stocks can also be combined with additives, such as those mentioned above, to make formulated lubricants.

Configuration Examples

FIG. 1 schematically shows a first configuration for processing of a deasphalted oil feed 110. Optionally, deasphalted oil feed 110 can include a vacuum gas oil boiling range portion. In FIG. 1, a deasphalted oil feed 110 is exposed to hydrotreating and/or hydrocracking catalyst in a first hydroprocessing stage 120. The hydroprocessed effluent from first hydroprocessing stage 120 can be separated into one or more fuels fractions 127 and a 370° C.+ fraction 125. The 370° C.+ fraction 125 can be solvent dewaxed 130 to form one or more lubricant base stock products, such as one or more light neutral or heavy neutral base stock products 132 and a bright stock product 134.

Figure 2:
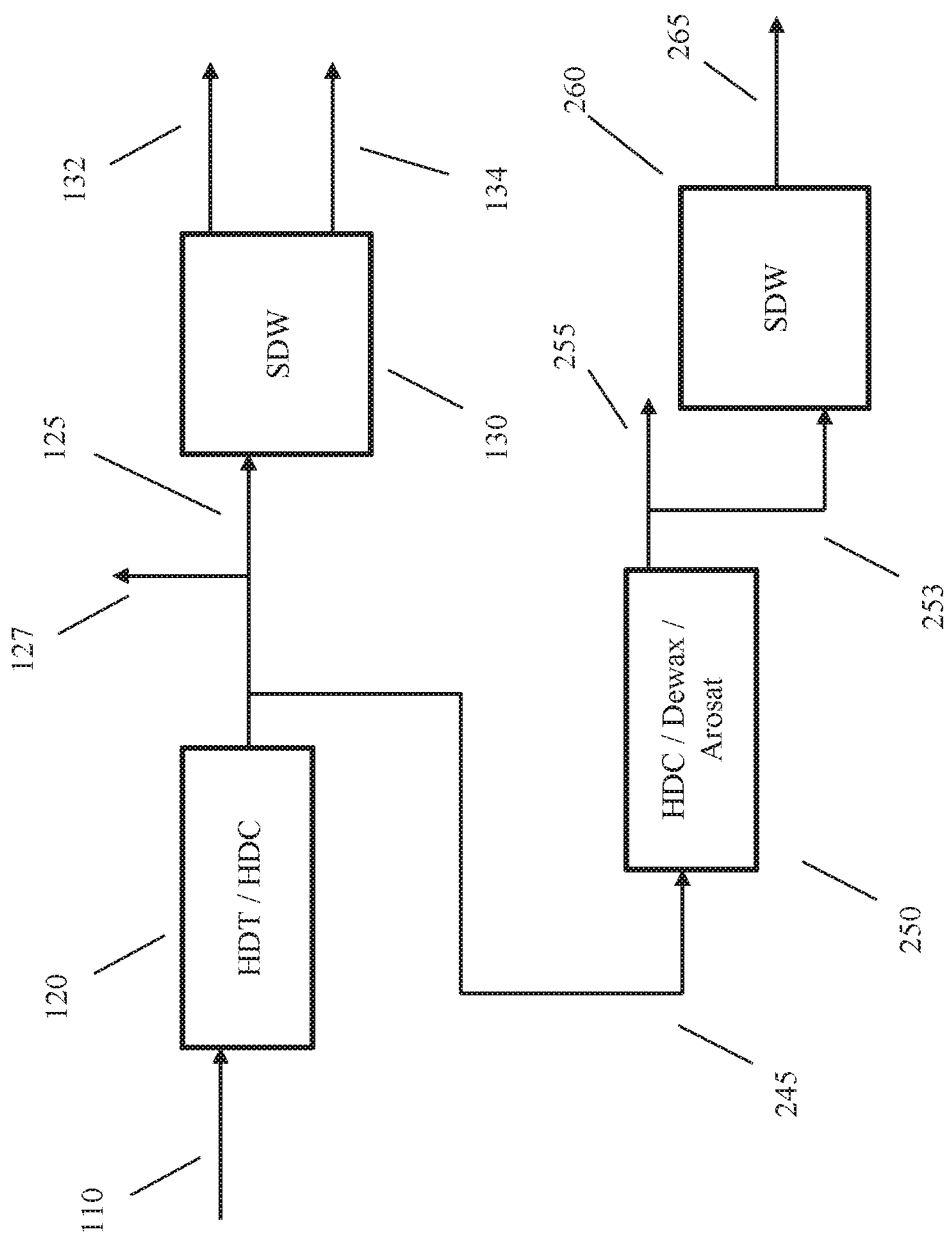
FIG. 2 schematically shows another example of a configuration for processing a deasphalted oil to form a lubricant base stock.

FIG. 2 schematically shows a second configuration for processing a deasphalted oil feed 110. In FIG. 2, solvent dewaxing stage 130 is optional. The effluent from first hydroprocessing stage 120 can be separated to form at least one or more fuels fractions 127, a first 370° C.+ portion 245, and a second optional 370° C.+ portion 225 that can be used as the input for optional solvent dewaxing stage 130. The first 370° C.+ portion 245 can be used as an input for a second hydroprocessing stage 250. The second hydroprocessing stage can correspond to a sweet hydroprocessing stage for performing catalytic dewaxing, aromatic saturation, and optionally further performing hydrocracking. In FIG. 2, at least a portion 253 of the catalytically dewaxed output 255 from second hydroprocessing stage 250 can be solvent dewaxed 260 to form at least a solvent processed lubricant boiling range product 265 that has a T10 boiling point of at least 510° C. and that corresponds to a Group II bright stock.

Figure 3:
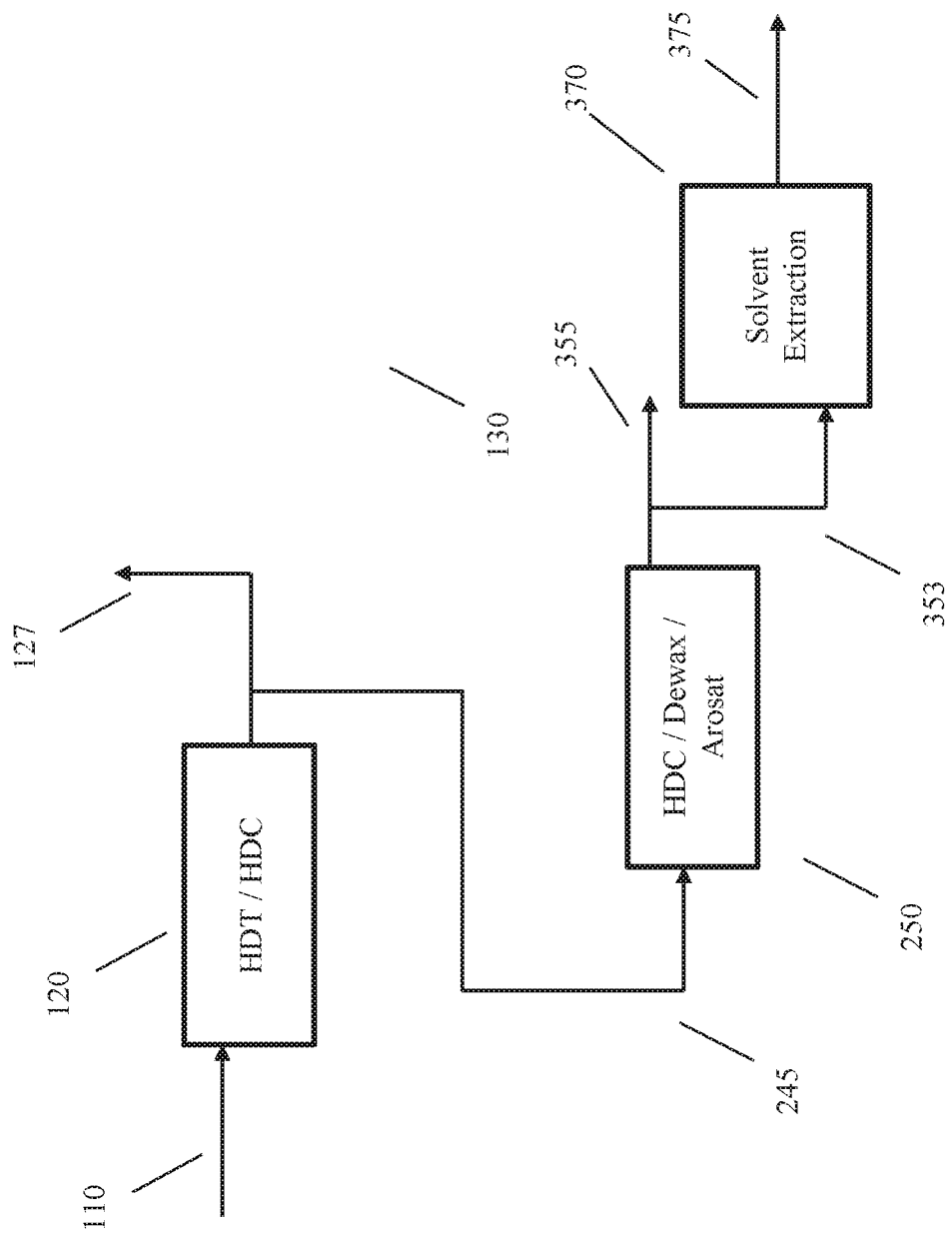
FIG. 3 schematically shows another example of a configuration for processing a deasphalted oil to form a lubricant base stock.

FIG. 3 schematically shows another configuration for producing a Group II bright stock. In FIG. 3, at least a portion 353 of the catalytically dewaxed output 355 from the second hydroprocessing stage 250 is solvent extracted 370 to form at least a processed lubricant boiling range product 375 that has a T10 boiling point of at least 510° C. and that corresponds to a Group II bright stock.

Figure 6:
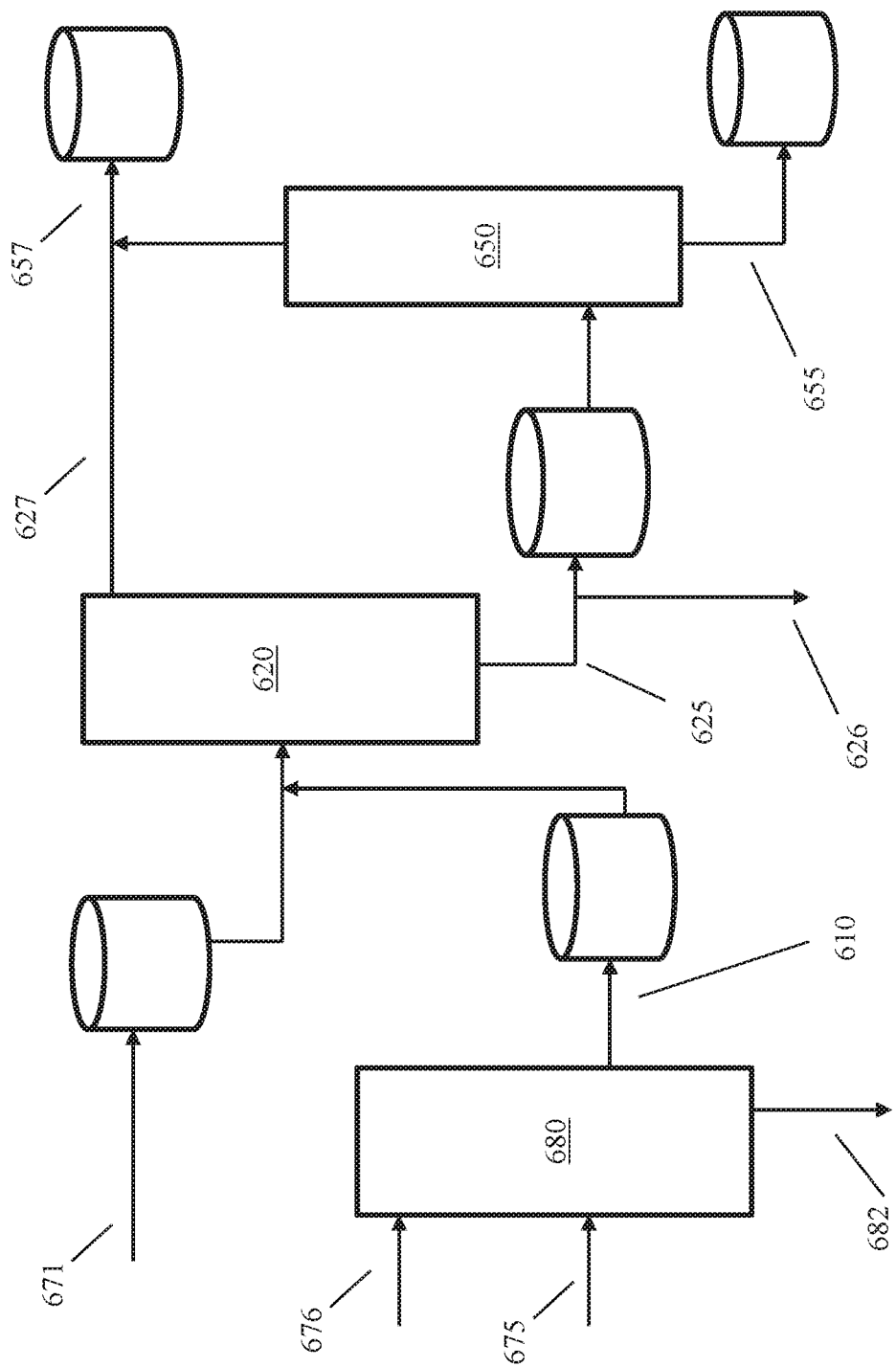
FIG. 6 schematically shows an example of a configuration for catalytic processing of deasphalted oil to form lubricant base stocks.

FIG. 6 schematically shows yet another configuration for producing a Group II bright stock. In FIG. 6, a vacuum resid feed 675 and a deasphalting solvent 676 is passed into a deasphalting unit 680. In some aspects, deasphalting unit 680 can perform propane deasphalting, but in other aspects a $C_{4+}$ solvent can be used. Deasphalting unit 680 can produce a rock or asphalt fraction 682 and a deasphalted oil 610. Optionally, deasphalted oil 610 can be combined with another vacuum gas oil boiling range feed 671 prior to being introduced into first (sour) hydroprocessing stage 620. A lower boiling portion 627 of the effluent from hydroprocessing stage 620 can be separated out for further use and/or processing as one or more naphtha fractions and/or distillate fractions. A higher boiling portion 625 of the hydroprocessing effluent can be a) passed into a second (sweet) hydroprocessing stage 650 and/or b) withdrawn 626 from the processing system for use as a fuel, such as a fuel oil or fuel oil blendstock. Second hydroprocessing stage 650 can produce an effluent that can be separated to form one or more fuels fractions 657 and one or more lubricant base stock fractions 655, such as one or more bright stock fractions.

Example 1

In this example, a deasphalted oil was processed in a configuration similar to FIG. 1. The deasphalted oil was derived from deasphalting of a resid fraction using pentane as a solvent. The properties of the deasphalted oil are shown in Table 1. The yield of deasphalted oil was 75 wt % relative to the feed.

TABLE 1

| Deasphalted Oil from Pentane Deasphalting (75 wt % yield) | |
|---|---|
| API Gravity | 12.2 |
| Sulfur (wt %) | 3.72 |
| Nitrogen (wppm) | 2557 |
| Ni (wppm) | 7.1 |
| V (wppm) | 19.7 |
| CCR (wt %) | 12.3 |
| Wax (wt %) | 4.6 |
| GCD Distillation (wt %) | (° C.) |
| 5% | 522 |
| 10% | 543 |
| 30% | 586 |
| 50% | 619 |

TABLE 1-continued

| Deasphalted Oil from Pentane Deasphalting (75 wt % yield) | |
|---|---|
| 70% | 660 |
| 90% | 719 |

The deasphalted oil in Table 1 was processed at 0.2 hr$^{-1}$ LHSV, a treat gas rate of 8000 scf/b, and a pressure of 2250 psig over a catalyst fill of 50 vol % demetalization catalyst, 42.5 vol % hydrotreating catalyst, and 7.5% hydrocracking catalyst by volume. The demetallization catalyst was a commercially available large pore supported demetallization catalyst. The hydrotreating catalyst was a stacked bed of commercially available supported NiMo hydrotreating catalyst and commercially available bulk NiMo catalyst. The hydrocracking catalyst was a standard distillate selective catalyst used in industry. Such catalysts typically include NiMo or NiW on a zeolite/alumina support. Such catalysts typically have less than 40 wt % zeolite of a zeolite with a unit cell size of less than 34.38 Angstroms. A preferred zeolite content can be less than 25 wt % and/or a preferred unit cell size can be less than 24.32 Angstroms. Activity for such catalysts can be related to the unit cell size of the zeolite, so the activity of the catalyst can be adjusted by selecting the amount of zeolite. The feed was exposed to the demetallization catalyst at 745° F. (396° C.) and exposed to the combination of the hydrotreating and hydrocracking catalyst at 765° F. (407° C.) in an isothermal fashion.

The hydroprocessed effluent was distilled to form a 510° C.+ fraction and a 510° C.-fraction. The 510° C.− fraction could be solvent dewaxed to produce lower viscosity (light neutral and/or heavy neutral) lubricant base stocks. The 510° C.+ fraction was solvent dewaxed to remove the wax. The properties of the resulting Group I bright stock are shown in Table 2. The low cloud point demonstrates the haze free potential of the bright stock, as the cloud point differs from the pour point by less than 5° C.

TABLE 2

| Group I bright stock properties | |
|---|---|
| Product Fraction | 510° C.+ |
| VI | 98.9 |
| KV @100° C. | 27.6 |
| KV @40° C. | 378 |
| Pour Pt (° C.) | −15 |
| Cloud Pt (° C.) | −11 |

Example 2

In this example, a deasphalted oil was processed in a configuration similar to FIG. 1. The deasphalted oil described in Table 1 of Example 1 was mixed with a lighter boiling range vacuum gas oil in a ratio of 65 wt % deasphalted oil to 35 wt % vacuum gas oil. The properties of the mixed feed are shown in Table 3.

TABLE 3

| Pentane deasphalted oil (65%) and vacuum gas oil (35%) properties | |
|---|---|
| API Gravity | 13.7 |
| Sulfur (wt %) | 3.6 |
| Nitrogen (wppm) | 2099 |
| Ni (wppm) | 5.2 |

TABLE 3-continued

| Pentane deasphalted oil (65%) and vacuum gas oil (35%) properties | |
|---|---|
| V (wppm) | 14.0 |
| CCR (wt %) | 8.1 |
| Wax (wt %) | 4.2 |
| GCD Distillation (wt %) | (° C.) |
| 5% | 422 |
| 10% | 465 |
| 30% | 541 |
| 50% | 584 |
| 70% | n/a |
| 90% | 652 |

The mixed feed was treated with conditions and catalysts similar to those used in Example 1, with the exception of an increase in reactor temperature to adjust for catalyst aging and slightly higher conversion amounts. The feed was exposed to the demetallization catalyst at 750° F. (399° C.) and the hydrotreating/hydrocracking catalysts at 770° F. (410° C.). After separation to remove fuels fractions, the 370° C.+ portion was solvent dewaxed. Bright stocks were formed from the solvent dewaxed effluent using a 510° C.+ cut and using a second deep cut at 571° C.+. The properties of the two types of possible bright stocks are shown in Table 4. (For clarity, the 510° C.+ bright stock includes the 571° C.+ portion. A separate sample was used to form the 571° C.+ bright stock shown in Table 4.)

TABLE 4

| Group I bright stocks | | |
|---|---|---|
| Product Fraction | 510° C.+ | 571° C.+ |
| VI | 108.9 | 112.2 |
| KV @100° C. | 19.9 | 35.4 |
| KV @40° C. | 203 | 476 |
| Pour Pt (° C.) | −14 | |
| Cloud Pt (° C.) | −12 | |

Example 3

A configuration similar to FIG. 1 was used to process a deasphalted oil formed from butane deasphalting (55 wt % deasphalted oil yield). The properties of the deasphalted oil are shown in Table 5.

TABLE 5

| Butane deasphalted oil (55 wt % yield) | |
|---|---|
| API Gravity | 14.0 |
| Sulfur (wt %) | 2.8 |
| Nitrogen (wppm) | 2653 |
| Ni (wppm) | 9.5 |
| V (wppm) | 14.0 |
| CCR (wt %) | 8.3 |
| Wax (wt %) | 3.9 |
| GCD Distillation (wt %) | (° C.) |
| 5% | 480 |
| 10% | 505 |
| 30% | 558 |
| 50% | 597 |
| 70% | 641 |
| 90% | 712 |

The deasphalted oil was converted to bright stock with low haze characteristics using process conditions and catalysts similar to those in Example 1, with the exception of the reaction temperatures. The deasphalted oil was exposed to the first hydroprocessing stage in two separate runs with all catalysts (demetallization, hydrotreating, hydrocracking) at a temperature of 371° C. The lower conversion in the second run is believed to be due to deactivation of catalyst, as would typically be expected for this type of heavy feed. The effluents from both runs were distilled to form a 510° C.+ fraction. The 510° C.+ fraction was solvent dewaxed. The resulting solvent dewaxed oils had the properties shown in Table 6. Table 6 also shows the difference in 370° C. conversion during the two separate runs.

TABLE 6

Group I bright stock properties

| Product Fraction | First run | Second run |
|---|---|---|
| VI | 97.5 | 90 |
| KV @100° C. | 27.3 | 35.2 |
| KV @40° C. | 378 | 619 |
| Pour Pt (° C.) | −19 | −18.5 |
| Cloud Pt (° C.) | −13 | −15 |
| Conversion (wt % relative to 510° C.) | 54.3 | 41.3 |

The low cloud point of both samples demonstrates the haze free potential of the bright stock, as the cloud point differs from the pour point for both samples by 6° C. or less.

Example 4

A configuration similar to FIG. 2 was used to process a deasphalted oil formed from butane deasphalting (55 wt % deasphalted oil yield). The properties of the deasphalted oil are shown in Table 5. The deasphalted oil was then hydroprocessed according to the conditions in Example 3. At least a portion of the hydroprocessed deasphalted oil was then exposed to further hydroprocessing without being solvent dewaxed.

The non-dewaxed hydrotreated product was processed over combinations of low unit cell size USY and ZSM-48. The resulting product had a high pour cloud spread differential resulting in a hazy product. However, a post-treat solvent dewaxing was able to remove that haze at a modest 3% loss in yield. Processing conditions for the second hydroprocessing stage included a hydrogen pressure of 1950 psig and a treat gas rate of 4000 scf/b. The feed into the second hydroprocessing stage was exposed to a) a 0.6 wt % Pt on USY hydrocracking catalyst (unit cell size less than 24.32, silica to alumina ratio of 35, 65 wt % zeolite/35 wt % binder) at 3.1 hr$^{-1}$ LHSV and a temperature of 665° F.; b) a 0.6 wt % Pt on ZSM-48 dewaxing catalyst (90:1 silica to alumina, 65 wt % zeolite/35 wt % binder) at 2.1 hr$^{-1}$ LHSV and a temperature of 635° F.; and c) 0.3 wt % Pt/0.9 wt % Pd on MCM-41 aromatic saturation catalyst (65 wt % zeolite/35 wt % binder) at 0.9 hr LHSV and a temperature of 480° F. The resulting properties of the 510° C.+ portion of the catalytically dewaxed effluent are shown in Table 7, along with the 510° C. conversion within the hydrocracking/catalytic dewaxing/aromatic saturation processes

TABLE 7

Catalytically dewaxed effluent

| Product Fraction | |
|---|---|
| VI | 104.4 |
| KV @100° C. | 26.6 |
| KV @40° C. | 337 |
| Pour Pt (° C.) | −28 |
| Cloud Pt (° C.) | 8.4 |
| Conversion (wt % relative to 510° C.) | 49 |

The product shown in Table 7 was hazy. However, an additional step of solvent dewaxing with a loss of only 2.5 wt % yield resulted in a bright and clear product with the properties shown in Table 8. It is noted that the pour point and the cloud point differ by slightly less than 20° C. The solvent dewaxing conditions included a slurry temperature of −30° C., a solvent corresponding to 35 wt % methyl ethyl ketone and 65 wt % toluene, and a solvent dilution ratio of 3:1.

TABLE 8

Solvent Processed 510° C.+ product (Group II bright stock)

| Product Fraction | |
|---|---|
| VI | 104.4 |
| KV @100° C. | 25.7 |
| KV @40° C. | 321 |
| Pour Pt (° C.) | −27 |
| Cloud Pt (° C.) | −7.1 |

Example 5

The deasphalted oil and vacuum gas oil mixture shown in Table 3 of Example 2 was processed in a configuration similar to FIG. 3. The conditions and catalysts in the first hydroprocessing stage were similar to Example 1, with the exception of adjustments in temperature to account for catalyst aging. The demetallization catalyst was operated at 744° F. (396° C.) and the HDT/HDC combination was operated at 761° F. (405° C.). This resulted in conversion relative to 510° C. of 73.9 wt % and conversion relative to 370° C. of 50 wt %. The hydroprocessed effluent was separated to remove fuels boiling range portions from a 370° C.+ portion. The resulting 370° C.+ portion was then further hydroprocessed. The further hydroprocessing included exposing the 370° C.+ portion to a 0.6 wt % Pt on ZSM-48 dewaxing catalyst (70:1 silica to alumina ratio, 65 wt % zeolite to 35 wt % binder) followed by a 0.3 wt % Pt/0.9 wt % Pd on MCM-41 aromatic saturation catalyst (65% zeolite to 35 wt % binder). The operating conditions included a hydrogen pressure of 2400 psig, a treat gas rate of 5000 scf/b, a dewaxing temperature of 658° F. (348° C.), a dewaxing catalyst space velocity of 1.0 hr$^{-1}$, an aromatic saturation temperature of 460° F. (238° C.), and an aromatic saturation catalyst space velocity of 1.0 hr$^{-1}$. The properties of the 560° C.+ portion of the catalytically dewaxed effluent are shown in Table 9. Properties for a raffinate fraction and an extract fraction derived from the catalytically dewaxed effluent are also shown.

TABLE 9

Catalytically dewaxed effluent

| Product Fraction | 560° C.+ CDW effluent | Raffinate (yield 92.2%) | Extract |
|---|---|---|---|
| API | 30.0 | 30.2 | 27.6 |
| VI | 104.2 | 105.2 | 89 |
| KV @100° C. | 29.8 | 30.3 | 29.9 |
| KV @40° C. | 401 | 405 | 412 |
| Pour Pt (° C.) | −21 | −30 | |
| Cloud Pt (° C.) | 7.8 | −24 | |

Although the catalytically dewaxed effluent product was initially clear, haze developed within 2 days. Solvent dewaxing of the catalytically dewaxed effluent product in Table 9 did not reduce the cloud point significantly (cloud after solvent dewaxing of 6.5° C.) and removed only about 1 wt % of wax, due in part to the severity of the prior catalytic dewaxing. However, extracting the catalytically dewaxed product shown in Table 9 with n-methyl pyrrolidone (NMP) at a solvent/water ratio of 1 and at a temperature of 100° C. resulted in a clear and bright product with a cloud point of −24° C. that appeared to be stable against haze formation. The extraction also reduced the aromatics content of the catalytically dewaxed product from about 2 wt % aromatics to about 1 wt % aromatics. This included reducing the 3-ring aromatics content of the catalytically dewaxed effluent (initially about 0.2 wt %) by about 80%. This result indicates a potential relationship between waxy haze formation and the presence of polynuclear aromatics in a bright stock.

Example 6

A feed similar to Example 5 were processed in a configuration similar to FIG. 2, with various processing conditions were modified. The initial hydroprocessing severity was reduced relative to the conditions in Example 5 so that the initial hydroprocessing conversion was 59 wt % relative to 510° C. and 34.5 wt % relative to 370° C. These lower conversions were achieved by operating the demetallization catalyst at 739° F. (393° C.) and the hydrotreating/hydrocracking catalyst combination at 756° F. (402° C.).

The hydroprocessed effluent was separated to separate fuels boiling range fraction(s) from the 370° C.+ portion of the hydroprocessed effluent. The 370° C.+ portion was then treated in a second hydroprocessing stage over the hydrocracking catalyst, and dewaxing catalyst described in Example 4. Additionally, a small amount of a hydrotreating catalyst (hydrotreating catalyst LHSV of 10 hr$^{-1}$) was included prior to the hydrocracking catalyst, and the feed was exposed to the hydrotreating catalyst under substantially the same conditions as the hydrocracking catalyst. The reaction conditions included a hydrogen pressure of 2400 psig and a treat gas rate of 5000 scf/b. In a first run, the second hydroprocessing conditions were selected to under dewax the hydroprocessed effluent. The under-dewaxing conditions corresponded to a hydrocracking temperature of 675° F. (357° C.), a hydrocracking catalyst LHSV of 1.2 h$^{-1}$, a dewaxing temperature of 615° F. (324° C.), a dewaxing catalyst LHSV of 1.2 h$^{-1}$, an aromatic saturation temperature of 460° F. (238° C.), and an aromatic saturation catalyst LHSV of 1.2 h$^{-1}$. In a second run, the second hydroprocessing conditions were selected to more severely dewax the hydroprocessed effluent. The higher severity dewaxing conditions corresponded to a hydrocracking temperature of 675° F. (357° C.), a hydrocracking catalyst LHSV of 1.2 h$^{-1}$, a dewaxing temperature of 645° F. (340° C.), a dewaxing catalyst LHSV of 1.2 h$^{-1}$, an aromatic saturation temperature of 460° F. (238° C.), and an aromatic saturation catalyst LHSV of 1.2 hr$^{1}$. The 510° C.+ portions of the catalytically dewaxed effluent are shown in Table 10.

TABLE 10

Catalytically dewaxed effluents

| Product Fraction | Under-dewaxed | Higher severity |
|---|---|---|
| VI | 106.6 | 106.4 |
| KV @100° C. | 37.6 | 30.5 |
| KV @40° C. | 551 | 396 |
| Pour Pt (° C.) | −24 | −24 |
| Cloud Pt (° C.) | 8.6 | 4.9 |

Both samples in Table 10 were initially bright and clear, but a haze developed in both samples within one week. Both samples were solvent dewaxed under the conditions described in Example 4. This reduced the wax content of the under-dewaxed sample to 6.8 wt % and the wax content of the higher severity dewaxing sample to 1.1 wt %. The higher severity dewaxing sample still showed a slight haze. However, the under-dewaxed sample, after solvent dewaxing, had a cloud point of −21° C. and appeared to be stable against haze formation.

Example 7—Viscosity and Viscosity Index Relationships

Figure 4:
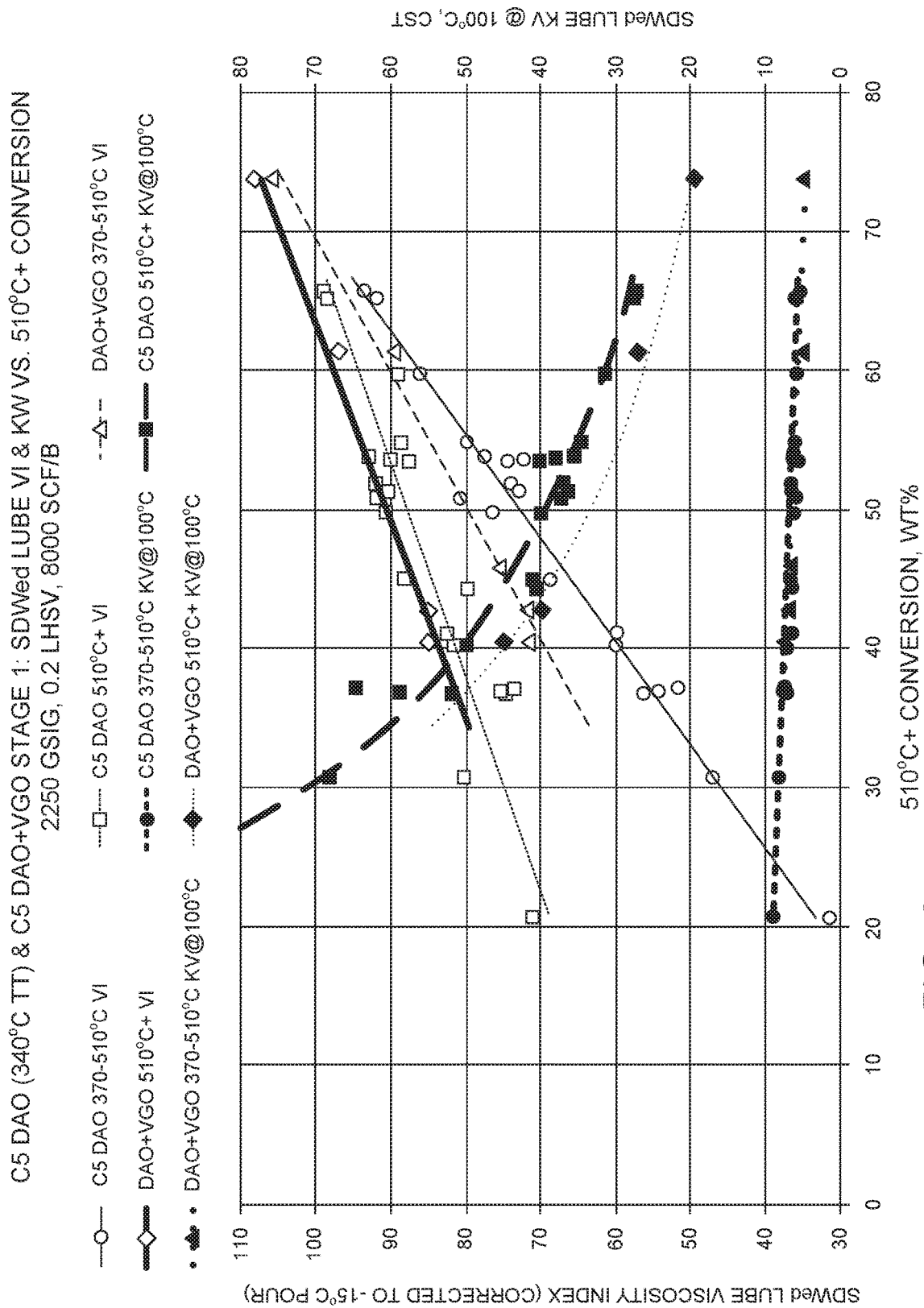
FIG. 4 shows results from processing a pentane deasphalted oil at various levels of hydroprocessing severity.

FIG. 4 shows an example of the relationship between processing severity, kinematic viscosity, and viscosity index for lubricant base stocks formed from a deasphalted oil. The data in FIG. 4 corresponds to lubricant base stocks formed form a pentane deasphalted oil at 75 wt % yield on resid feed. The deasphalted oil had a solvent dewaxed VI of 75.8 and a solvent dewaxed kinematic viscosity at 100° C. of 333.65.

In FIG. 4, kinematic viscosities (right axis) and viscosity indexes (left axis) are shown as a function of hydroprocessing severity (510° C.+ conversion) for a deasphalted oil processed in a configuration similar to FIG. 1, with the catalysts described in Example 1. As shown in FIG. 4, increasing the hydroprocessing severity can provide VI uplift so that deasphalted oil can be converted (after solvent dewaxing) to lubricant base stocks. However, increasing severity also reduces the kinematic viscosity of the 510° C.+ portion of the base stock, which can limit the yield of bright stock. The 370° C.-510° C. portion of the solvent dewaxed product can be suitable for forming light neutral and/or heavy neutral base stocks, while the 510° C.+ portion can be suitable for forming bright stocks and/or heavy neutral base stocks.

Example 8—Variations in Sweet and Sour Hydrocracking

In addition to providing a method for forming Group II base stocks from a challenged feed, the methods described herein can also be used to control the distribution of base stocks formed from a feed by varying the amount of conversion performed in sour conditions versus sweet conditions. This is illustrated by the results shown in FIG. 5.

Figure 5:
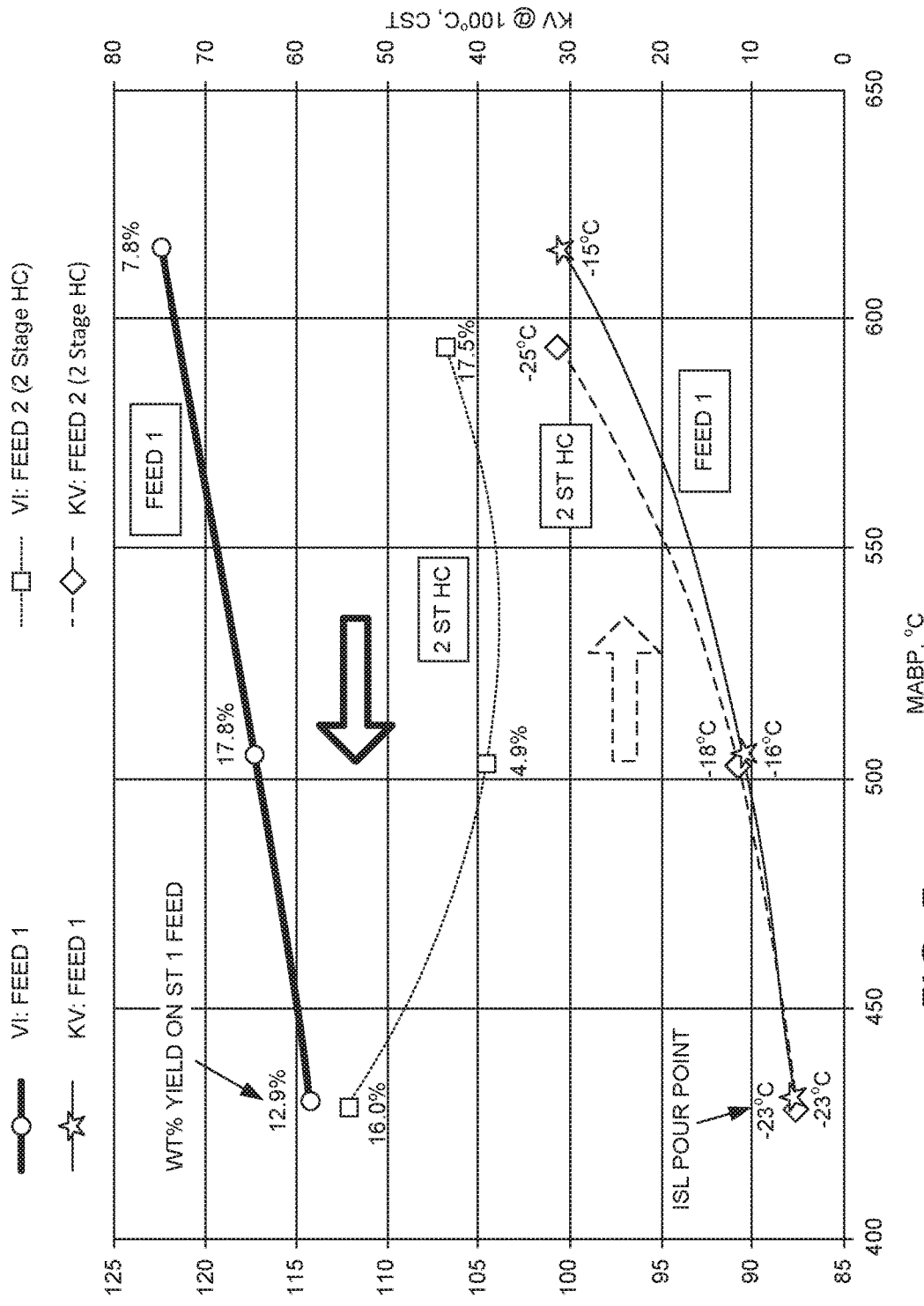
FIG. 5 shows results from processing deasphalted oil in configurations with various combinations of sour hydrocracking and sweet hydrocracking.

In FIG. 5, the upper two curves show the relationship between the cut point used for forming a lubricant base stock of a desired viscosity (bottom axis) and the viscosity index of the resulting base stock (left axis). The curve corresponding to the circle data points represents processing of a $C_5$ deasphalted oil using a configuration similar to FIG. 2, with all of the hydrocracking occurring in the sour stage. The curve corresponding to the square data points corresponds to performing roughly half of the hydrocracking conversion in the sour stage and the remaining hydrocracking conversion in the sweet stage (along with the catalytic dewaxing). The individual data points in each of the upper curves represent the yield of each of the different base stocks relative to the amount of feed introduced into the sour processing stage. It is noted that summing the data points within each curve shows the same total yield of base stock, which reflects the fact that the same total amount of hydrocracking conversion was performed in both types of processing runs. Only the location of the hydrocracking conversion (all sour, or split between sour and sweet) was varied.

The lower pair of curves provides additional information about the same pair of process runs. As for the upper pair of curves, the circle data points in the lower pair of curves represent all hydrocracking in the sour stage and the square data points correspond to a split of hydrocracking between sour and sweet stages. The lower pair of curves shows the relationship between cut point (bottom axis) and the resulting kinematic viscosity at 100° C. (right axis). As shown by the lower pair of curves, the three cut point represent formation of a light neutral base stock (5 or 6 cSt), a heavy neutral base stock (10-12 cSt), and a bright stock (about 30 cSt). The individual data points for the lower curves also indicate the pour point of the resulting base stock.

As shown in FIG. 5, altering the conditions under which hydrocracking is performed can alter the nature of the resulting lubricant base stocks. Performing all of the hydrocracking conversion during the first (sour) hydroprocessing stage can result in higher viscosity index values for the heavy neutral base stock and bright stock products, while also producing an increased yield of heavy neutral base stock. Performing a portion of the hydrocracking under sweet conditions increased the yield of light neutral base stock and bright stock with a reduction in heavy neutral base stock yield. Performing a portion of the hydrocracking under sweet conditions also reduced the viscosity index values for the heavy neutral base stock and bright stock products. This demonstrates that the yield of base stocks and/or the resulting quality of base stocks can be altered by varying the amount of conversion performed under sour conditions versus sweet conditions.

Example 9—Feedstocks and DAOs

Table 1 shows properties of two types of vacuum resid feeds that are potentially suitable for deasphalting, referred to in this example as Resid A and Resid B. Both feeds have an API gravity of less than 6, a specific gravity of at least 1.0, elevated contents of sulfur, nitrogen, and metals, and elevated contents of carbon residue and n-heptane insolubles.

TABLE 11

Resid Feed Properties

| | Resid (566° C.+) | |
|---|---|---|
| | Resid A | Resid B |
| API Gravity (degrees) | 5.4 | 4.4 |
| Specific Gravity (15° C.) (g/cc) | 1.0336 | 1.0412 |

TABLE 11-continued

Resid Feed Properties

| | Resid (566° C.+) | |
|---|---|---|
| | Resid A | Resid B |
| Total Sulfur (wt %) | 4.56 | 5.03 |
| Nickel (wppm) | 43.7 | 48.7 |
| Vanadium (wppm) | 114 | 119 |
| TAN (mg KOH/g) | 0.314 | 0.174 |
| Total Nitrogen (wppm) | 4760 | 4370 |
| Basic Nitrogen (wppm) | 1210 | 1370 |
| Carbon Residue (wt %) | 24.4 | 25.8 |
| n-heptane insolubles (wt %) | 7.68 | 8.83 |
| Wax (Total − DSC) (wt %) | 1.4 | 1.32 |
| KV @ 100° C. (cSt) | 5920 | 11200 |
| KV @ 135° C. (cSt) | 619 | 988 |

The resids shown in Table 11 were used to form deasphalted oil. Resid A was exposed to propane deasphalting (deasphalted oil yield <40%) and pentane deasphalting conditions (deasphalted oil yield ~65%). Resid B was exposed to butane deasphalting conditions (deasphalted oil yield ~75%). Table 12 shows properties of the resulting deasphalted oils.

TABLE 12

Examples of Deasphalted Oils

| | $C_3$ DAO | $C_4$ DAO | $C_5$ DAO |
|---|---|---|---|
| API Gravity (degrees) | 22.4 | 12.9 | 12.6 |
| Specific Gravity (15° C.) (g/cc) | 0.9138 | 0.9782 | 0.9808 |
| Total Sulfur (wt %) | 2.01 | 3.82 | 3.56 |
| Nickel (wppm) | <0.1 | 5.2 | 5.3 |
| Vanadium (wppm) | <0.1 | 15.6 | 17.4 |
| Total Nitrogen (wppm) | 504 | 2116 | 1933 |
| Basic Nitrogen (wppm) | 203 | <N/A> | 478 |
| Carbon Residue (wt %) | 1.6 | 8.3 | 11.0 |
| KV @ 100° C. (cSt) | 33.3 | 124 | 172 |
| VI | 96 | 61 | <N/A> |
| SimDist (ASTM D2887) ° C. | | | |
| 5 wt % | 509 | 490 | 527 |
| 10 wt % | 528 | 515 | 546 |
| 30 wt % | 566 | 568 | 588 |
| 50 wt % | 593 | 608 | 619 |
| 70 wt % | 623 | 657 | 664 |
| 90 wt % | 675 | <N/A> | <N/A> |
| 95 wt % | 701 | <N/A> | <N/A> |

As shown in Table 12, the higher severity deasphalting provided by propane deasphalting results in a different quality of deasphalted oil than the lower severity $C_4$ and $C_5$ deasphalting that was used in this example. It is noted that the $C_3$ DAO has a kinematic viscosity @100° C. of less than 35, while the $C_4$ DAO and $C_5$ DAO have kinematic viscosities greater than 100. The $C_3$ DAO also generally has properties more similar to a lubricant base stock product, such as a higher API gravity, a lower metals content/sulfur content/nitrogen content, lower CCR levels, and/or a higher viscosity index.

Example 10—Deasphalting of Wide Cut Gas Oil

Performing deasphalting with $C_{5+}$ paraffins can potentially allow for greater yields of deasphalted oil. However, using a $C_{5+}$ paraffin or mixture of paraffins can pose challenges with regard to the flow properties of a resid type feed in a deasphalting system. In order to maintain desirable flow rates/flow properties during deasphalting of a resid type feed, deasphalting processes are typically performed at temperatures of about 190° C. or higher. At such temperatures, the small paraffins used as deasphalting solvents are gases. As a result, the solubility of deasphalting solvents tends to decrease with increasing temperature. When higher yields of deasphalted oil are desired, such as yields of about 60% or more relative to the weight of a resid type feed, the deasphalting solvent may not have sufficient solubility in the resid type feed at 190° C. or higher to generate a desired yield of deasphalted oil.

One option for increasing the yield can be to lower the temperature of the deasphalting process, which can increase the solubility of the deasphalting solvent and allow for greater yield. However, such a temperature decrease can also modify the flow properties of the resid type feed, which may result in difficulties with maintaining a flow of resid type feed through the deasphalting unit.

It has been determined that using a wide cut vacuum gas oil (VGO) that includes both resid boiling range compounds and a portion of vacuum gas oil boiling range compounds can mitigate difficulties related to compatibility of the deasphalting solvent when attempting to generate a high yield of deasphalted oil. For example, instead of using a resid with an initial boiling point between 430° C. and 450° C., a wide cut VGO with an initial boiling point of about 370° C. can be used. This can allow a desired yield of deasphalted oil to be generated while still maintaining a desired temperature for a deasphalting column.

Table 13 shows results from deasphalting a resid type feed using n-pentane as the deasphalting solvent at two different yields of deasphalted oil. In order to increase the yield of deasphalted oil from 65 wt % to 75 wt % (relative to the weight of the feed), the deasphalting temperature was decreased from 375° F. (190° C.) to 355° F. (~179° C.). Although this resulted in increased yield of deasphalted oil, the properties of the higher yield deasphalted oil were less favorable. For example, the sulfur content, n-heptane insoluble content, conradson carbon residue, and metals were all higher in the deasphalted oil at 75 wt % yield relative to the deasphalted oil at 65 wt % yield.

TABLE 13

Deasphalter Yield versus Deasphalter Temperature

| | | 355° F. (180° C.) 75% Lift | | 375° F. (190° C.) 65% Lift | |
|---|---|---|---|---|---|
| Parameter | Vac Resid | DAO | Rock | DAO | Rock |
| Density (g/ml) | 1.039-1.044 | 0.989 | 1.13-1.14 | 0.98 | 1.093 |
| Sulfur (wt %) | 4.3-4.6 | 3.7-3.9 | 7.4-7.7 | 3.46 | 8 |
| Nitrogen (wppm) | 3750-4380 | 2500-2700 | 6700-7600 | 2527 | 6100 |
| n-heptane insolubles (wt %) | 12 | 0.23 | 55 | 0.04 | 40 |
| CCR (wt %) | 23-25 | 13.3-13.4 | 46.4-54.7 | 10.9 | 47 |
| Ni + V (wppm) | 145-180 | 28-29 | 430-540 | 17.8 | 380 |
| Viscosity @ 100° C. (cSt) | 4600-7700 | 230-260 | * | 173 | * |
| IBP (° C.) | 440 | 430 | 551 | 400 | 526 |

The results in Table 13 are based on deasphalting of a vacuum resid formed by distillation of a feed. In Table 14, deasphalting was performed on a wide cut VGO formed by distillation of the same feed. By including a portion of vacuum gas oil in the feed to deasphalting, a yield of 75 wt % deasphalted oil was achieved at 375° F. (190° C.). Additionally, the resulting deasphalted oil had properties that were closer in nature to the 65 wt % yield deasphalted oil in Table 13. This demonstrates that having a wider cut on the feedstock allowed a higher quality deasphalted oil to be produced at a higher deasphalted oil yield.

TABLE 14

Deasphalting of Wide Cut VGO

| | | 375° F. (190° C.) 75% Lift | |
|---|---|---|---|
| Parameter | Wide Cut VGO | DAO | Rock |
| Density (g/ml) | 1.027 | 0.976 | 1.139 |
| Sulfur (wt %) | 4 | 3.41 | 6.89 |
| Nitrogen (wppm) | 3300 | 2453 | 6900 |
| n-heptane insolubles (wt %) | 11.2 | 0.09 | 44 |
| CCR (wt %) | 22 | 10 | 49.7 |
| Ni + V (wppm) | 133 | 17.9 | 378 |
| Viscosity @ 100° C. (cSt) | 5100 | 112 | * |
| IBP (° C.) | 360 | 285 | 550 |

Another benefit of using a wide cut VGO can be related to use of alternative types of solvents. For example, various refinery processes can potentially generate output streams containing mixtures of $C_5$ compounds. Table 15 shows examples of a first naphtha distillation cut mostly corresponding to isopentane and a second $C_5$ distillation cut that can be generated from the effluent of a naphtha distillation unit. Optionally, a mixed $C_5$ stream such as the right hand column in Table 15 could be distilled to avoid inclusion of benzene. Converting the mixed compositions of Table 15 into a relatively pure isopentane stream or n-pentane stream for use as a deasphalting solvent can require substantial additional cost. It would be beneficial from both a cost and additional equipment standpoint if the mixed $C_5$ compositions of Table 15 could be used as a deasphalting solvent, instead of a pure solvent such as n-pentane or isopentane.

TABLE 15

Mixed C5 Compositions

| | iC5 (wt %) | mC5 (wt %) |
|---|---|---|
| Isobutene | 0.1 | 0 |
| Butane | 6.4 | 0.8 |
| 2-methylbutane (iC5) | 90.0 | 23.8 |
| Pentane (nC5) | 3.5 | 37.0 |
| 2-methylpentane (iC6) | 0 | 22.2 |
| Hexane (nC6) | 0 | 10.5 |
| Heptane | 0 | 0.1 |
| Octane | 0 | 0 |
| Cyclopentane | 0 | 2.4 |
| Cyclohexane | 0 | 1.0 |
| Cycloheptane | 0 | 0 |
| Benzene | 0 | 2.1 |
| Methylbenzene | 0 | 0.1 |

One conventional difficulty with using a mixed composition as a deasphalting solvent can be the reduced deasphalting temperature required to generate a desired yield. Table 16 shows the deasphalted oil yield as a function of deasphalting temperature for n-pentane and iso-pentane under conditions similar to those used for deasphalting in Tables 13 and 14. As shown in Table 16, the required temperature for generating a desired yield with iso-pentane is substantially lower than the corresponding temperature for n-pentane. A similar proportional reduction in the deasphalting temperature would be expected if, for example, if one of the mixed $C_5$ streams from Table 15 was used as a deasphalting solvent. However, using a wide cut VGO as the feed for deasphalting can offset or mitigate the reduction in temperature that is required for a desired yield of deasphalted oil.

TABLE 16

Deasphalting Lifts with n-Pentane and Isopentane

| Lift (lv %) | nC5 Temp (° C.) | iC5 Temp (° C.) |
|---|---|---|
| 75 | 180 | 154 |
| 70 | 188 | 171 |
| 65 | 191 | 178 |

Example 11—Yield Comparison of Product Types

The methods described herein can provide advantages for converting deasphalted oils to higher value products. Traditionally, vacuum resid fractions have been processed using severe types of processing, such as coking or slurry hydroconversion. Table 17 shows examples of typical product yields that might be expected based on coking or slurry hydroconversion of a resid feed.

TABLE 17

Thermal Cracking and Slurry Hydroconversion Yields

| | Delayed Coker (vol %) | FlexiCoker (vol %) | Slurry HDC (vol %) |
|---|---|---|---|
| Gas, foe | 9% | 16% | 15% |
| Naphtha | 16% | 18% | 19% |
| Diesel | 24% | 19% | 50% |
| Lube Base stocks | 0% | 0% | 0% |
| Gasoil (371° C.+) | 28% | 24% | 27% |
| Heavy Gasoil/Coke/ Pitch (566° C.+) | 29% | 24% | 7% |

As shown in Table 17, coking of a resid teed tends to produce substantial amounts of coke. Coke is a low value product that has limited uses other than fuel value. In addition to transforming roughly 25% of the feed to coke, coking also generates a gas oil fraction which is generally not considered to be suitable for use as a lubricant base stock. Instead, the gas oil generated by coking is generally used as a fuel oil, or is used as a feed for fluid catalytic cracking. Slurry hydroconversion generates a smaller amount of low value pitch and/or heavy gas oil, and also can directly produce a higher proportion of diesel fuel. However, slurry hydroconversion can also require substantial amounts of hydrogen, so the operating costs that are required to perform slurry hydroconversion may not be justified based on the resulting diesel yield.

In contrast to traditional methods, deasphalting a resid followed by processing as described herein can produce a higher value product slate. Table 18 shows an example of product slates formed from the $C_4$ DAO and $C_5$ DAO shown in Table 12.

TABLE 18

Deasphalting and Lubes Processing Yields

| | $C_4$ DAO HDC (vol %) | $C_5$ DAO HDC (vol %) |
|---|---|---|
| Gas, foe | 2% | 2% |
| Naphtha | 9% | 16% |
| Diesel | 29% | 37% |
| Lube Base stocks | 35% | 35% |
| Gasoil (371° C.+) | 0% | 0% |
| Heavy Gasoil/Coke/ Pitch (566° C.+) | 35% | 25% |

As shown in Table 18, deasphalting of a resid initially forms a substantial amount of pitch or rock as a product, depending on the deasphalting conditions. However, substantially all of the desasphalted oil can then be converted to higher value products, such as the 35 vol % of lubricant base stocks that is shown in Table 18. The amount of light ends produced by deasphalting and lubes processing is also substantially lower than the light ends production from coking or slurry hydroconversion.

Example 12—Lubricant Base Stocks from Catalytic Processing of $C_4$ Deasphalted Oil A configuration similar to FIG. 6 was used to form lubricant base stocks from deasphalted oil formed by propane deasphalting. FIG. 7 shows compositional details for examples of bright stocks that were produced from catalytic processing of $C_3$ deasphalted oils (Samples I and II in FIG. 7). FIG. 7 also shows two reference bright stocks formed by either solvent dewaxing or catalytic dewaxing (Ref 1 and Ref 2), and an additional bright stock formed from a $C_3$ deasphalted oil (Sample III), but with a high cloud point of 6° C.

For the bright stocks shown as Samples I and II in FIG. 7, the bright stocks were formed by hydrotreatment (sour conditions) followed by catalytic dewaxing (sweet conditions) of the $C_3$ deasphalted oil. Samples I and II in FIG. 7 correspond to a bright stocks with less than 0.03 wt % sulfur and less than 10 wt % aromatics/greater than 90 wt % saturates. Thus, Samples I and II correspond to Group II bright stocks. The reference bright stocks in the first two columns of FIG. 7, as well as Sample III, also have less than 10 wt % aromatics/greater than 90 wt % saturates and therefore also correspond to Group II bright stocks.

The compositional characterization was done using $^{13}$C-NMR, FDMS (Field Desorption Mass Spectrometry), FTICR-MS (Fourier-Transform Ion Cyclotron Resonance Mass Spectrometry), and DSC (Differential Scanning Calorimetry). The differences in composition include the inventive base stocks having a higher degree of branching than a conventional bright stock. For example, the sum of the propyl and ethyl groups (Line 9) is greater than 1.7, or 1.8, or 1.9 per 100 carbon atoms in Samples I and II. Additionally, in Samples I and II, the types of individual branching are higher than their references. Samples I and II show a total number of terminal/pendant propyl groups greater than 0.85, or greater than 0.86, or greater than 0.90 per 100 carbon atoms: they show a total number of ethyl groups greater than 0.85, or greater than 0.88, or greater than 0.90, or greater than 0.93, or greater than 0.95 per 100 carbon atoms. Additionally, although not shown in FIG. 7, Samples I and II have a total number alpha carbon atoms greater than 2.1, or greater than 2.2, or greater than 2.22, or greater than 2.3 per 100 carbon atoms.

Further, the inventive base stocks exhibited more external branching within paraffinic chains. For Samples I and II, the total number of propyl and ethyl groups relative to epsilon carbon atoms was greater than 0.127, or greater than 0.130, or greater than 0.133, or greater than 0.140, or greater than 0.150 or greater than 0.160. Similarly, the ratio of propyl groups to epsilon carbon atoms was greater than 0.063 or greater than 0.065, and the ratio of ethyl groups to epsilon carbon atoms was greater than 0.064, or greater than 0.065, or greater than 0.068, or greater than 0.070, respectively. Additionally, although not shown in FIG. 7, the ratio of alpha carbons to the sum of propyl and ethyl groups is smaller in Samples I and II: less than 1.36, or less than 1.3, or less than 1.25, or less than 1.24.

Still other differences in the composition of Samples I and II over the references can be seen in the distribution of cycloparaffinic species as determined by FDMS. For example, the inventive bright stocks have at least 20% (i.e., at least 20 molecules per 100 molecules of the composition) of 2-ring cycloparaffins; at least 22% (i.e., at least 22 molecules per 100 molecules of the composition) of 3-ring cycloparaffins; less than 13.5% (i.e., less than 13.5 molecules per 100 molecules of the composition) of 5-ring cycloparaffins; and less than 8.5% (i.e., less than 8.5 molecules per 100 molecules of the composition), or less than 8.0 molecules per 100 molecules, or less than 7.0 molecules per 100 molecules, of 6-ring cycloparaffins. Comparing the ratio of 1, 2, and 3 ring cycloparaffins to 4, 5, and 6 ring cycloparaffins, differences are observed in that the ratio in Samples I and II is at least 1.1. Additionally, the ratio of 5 and 6 ring cycloparaffins to 2 and 3 ring cycloparaffins is less than 0.58, or less than 0.57.

Also, the inventive oils were also characterized using differential scanning calorimetry (DSC) to determine the total amount of residual wax and the distribution of residual wax as a function of temperature. The DSC cooling and heating curves were obtained for the base stocks described herein. Notably, the heating curve was generated by starting from a low temperature of nearly –80° C., at which point the sample is completely solidified, and then heating the sample at rate of about 10° C./min. As the temperature increases, typically, the heat flow rapidly decreases and reaches a minimum at around –20° C. to –10° C. Between –20° C. and around +10° C., the rate of heat flow increases as the microcrystalline wax melts. The typical rate of increase found in the references ranged from 0.00068 to 0.013 W/g-°C. whereas column 4 had a less rapid change in heat flow at a rate of 0.00042 W/g-° C., indicative of a novel composition and distribution of waxy species.

It was determined that the novel product composition space shown in FIG. 7 could be achieved using catalytic processing of $C_3$ deasphalted oil having a VI of about 96, a CCR of about 1.6 wt %, and with nitrogen of about 504 ppmw. It has further been found that a similar novel product composition space can be achieved with more challenging feedstocks such as base stocks produced from $C_4$ deasphalted oil or from $C_5$ deasphalted oil or from $C_{6+}$ deasphalted oil or from mixtures thereof. This is illustrated in FIG. 8, where base stock compositions are shown that derived from $C_4$ deasphalted oil (55-65% deasphalted oil yield). The base stocks shown were produced using catalytic processing with and without solvent post-processing steps. There is an increased risk of the appearance of haze in the final product if the stock does not occupy the compositional space described below. Samples IV and V in FIG. 8 correspond to base stocks that remained clear and bright, while Samples VI, VII, and VIII correspond to base stocks that developed a haze, as would be conventionally expected when attempting to form base stocks from a $C_{4+}$ DAO. Ref 1 and Ref 2 in FIG. 8 are the same as the references in FIG. 7.

The compositional characterization was done using 13C-NMR, FDMS, FTICR-MS, and DSC. The differences in composition include the inventive base stocks having a higher degree of branching than a conventional bright stock. For example, the sum of the terminal/pendant propyl and ethyl groups is greater than 1.7, or 1.75, or 1.8, or 1.85, or 1.9 per 100 carbon atoms in Samples IV and V. Additionally, in Samples IV and V, the types of individual branching are higher than the references. Specifically, Samples IV and V show a total number of terminal/pendant propyl groups greater than 0.86, or greater than 0.88 per 100 carbon atoms; they also show a total number of terminal/pendant ethyl groups greater than 0.88, or greater than 0.90, or greater than 0.93, or greater than 0.95 per 100 carbon atoms. Although not shown in FIG. 8, Samples IV and V also had a total number alpha carbon atoms of 2.3 or greater per 100 carbon atoms.

Further, the inventive base stocks exhibited more external branching within paraffinic chains. For Samples IV and V, the total number of propyl and ethyl groups relative to epsilon carbon atoms was greater than 0.124, or greater than 0.127, or greater than 0.130, or greater than 0.133. Similarly, the ratio of propyl groups to epsilon carbon atoms and the ratio of ethyl groups to epsilon carbon atoms was greater than 0.060 or greater than 0.063 or greater than 0.064 or greater than 0.065, and 0.064 or greater than 0.065, or greater than 0.068, respectively.

FDMS provides more information concerning the ring structures in the inventive bright stocks. Samples IV and V show increased prevalence of 1, 2 and 3 ring cycloparaffins and decreased prevalence of 4, 5 and 6 ring cycloparaffins. For example. Samples IV and V have at least 10.7% (i.e., at least 10.7 molecules per 100 molecules of the composition), or at least 11%, or at least 11.5%, or at least 11.9% 1 ring cycloparaffins; and at least 19.8%, or at least 20% (i.e., at least 20.0 molecules per 100 molecules of the composition), or at least 20.5%, or at least 20.8% 2 ring cycloparaffins; at least 21.8%, or at least 21.9%, or at least 22% (i.e., at least 22.0 molecules per 100 molecules of the composition) 3 ring cycloparaffins; less than 17.6% (i.e., less than 17.6 molecules per 100 molecules of the composition), or less than 17.5%, or less than 17.1%, or less than 17% 4 ring cycloparaffins; less than 11.9% (i.e., less than 11.9 molecules per 100 molecules of the composition), or less than 11.5%, or less than 11%, or less than 10.9% 5 ring cycloparaffins; and less than 7.2%, or less than 7% (i.e., less than 7.0 molecules per 100 molecules of the composition), or less than 6.5%, or less than 6.3% 6 ring cycloparaffins. Comparing the ratio of 1, 2, and 3 ring cycloparaffins to 4, 5, and 6 ring cycloparaffins, differences are observed in that the ratio in Samples IV and V is at least 1.41, or at least 1.45, or at least 1.5, or at least 1.55, or at least 1.59 (line 68). Samples IV and V also show a ratio of 5 and 6 ring cycloparaffins to 2 and 3 ring cycloparaffins of 0.40 or less.

Example 13—Lubricant Base Stocks from Catalytic Processing of $C_5$ Deasphalted Oil FIGS. 9 and 10 provide details from characterization of various base stock compositions that were formed from $C_5$ deasphalted oils. FIG. 9 shows properties determined using various techniques, including $^{13}C$-NMR, while FIG. 10 shows properties determined using FTICR-MS and FDMS.

Ref 1 is the same as Ref 1 from FIGS. 7 and 8. Samples A, B, and C correspond to novel compositions, while Samples D, E, F, and G correspond to additional comparative base stocks made from C$_5$ deasphalted oil.

The compositional characterization was done using $^{13}$C-NMR, FDMS, FTICR-MS, and DSC. The differences in composition include the inventive base stocks having a higher degree of branching than a conventional bright stock as observed using NMR. For example, as shown FIG. 9, the comparative and reference bright stocks have a sum of terminal/pendant propyl and terminal/pendant ethyl groups of 1.67 (or less) per 100 carbon atoms in the composition. By contrast, the inventive bright stocks have a value of at least 1.7, or at least 1.8, or at least 1.9, or at least 2, or at least 2.2 per 100 carbons. Similarly, individual values for terminal/pendant propyl and ethyl groups for the reference/comparative bright stocks are 0.84 or less and 1.04 or less (respectively) per 100 carbons. The inventive bright stocks (Samples A, B, and C) have values of at least 0.85, or at least 0.9 or at least 1.0 per 100 carbons for propyl groups and at least 0.85, or at least 1.0, or at least 1.1, or at least 1.15, or at least 1.2 per 100 carbons for ethyl groups. Further, although not shown in FIG. 12, the branch points of Samples A, B, and C are characterized by have a total branch points of at least 4.1 per 100 carbon atoms and of those branch points, less than 2.8 per 100 carbons are alpha carbons.

Samples A, B, and C showed more external branching within paraffinic chains as seen when comparing the ratios of various branch points to epsilon carbons. Comparing the ratio of the sum of propyl and ethyl groups to the epsilon carbons indicates a higher degree of branching in the inventive bright stocks. The reference/comparative bright stocks have a ratio of less than 0.13 for the sum of ethyl and propyl groups relative to the number of epsilon carbons, while the inventive bright stocks have at least 0.1, or at least 0.13, or at least 0.14, or at least 0.15, or at least 0.16 or at least 0.19 for the sum of ethyl and propyl groups to epsilon carbons. Individually comparing propyl or ethyl groups to epsilon carbons shows a similar relationship with reference bright stocks having less than 0.058 and 0.059 respectively. Samples A, B, and C have values of at least 0.06, or at least 0.07, or at least 0.08 or at least 0.09 for propyl/epsilon and at least 0.06, or at least 0.07, or at least 0.08, or at least 0.1 for ethyl/epsilon. Additionally, the total number of epsilon carbons is lower in the inventive bright stocks: greater than 14.5 for the reference/comparative bright stocks and less than 14.5, or less than 13, or less than 12.5, or less than 12.35 or less than 11 for the inventive bright stocks.

Although not shown in FIG. 9, the proportion of the type of branch points is also unique in the inventive bright stocks. The reference base stocks have a ratio of alpha carbons to ethyl groups of at least 2.8 and a ratio of alpha carbons to the sum of ethyl and propyl groups of at least 1.8. The inventive bright stocks have a ratio of alpha carbons to ethyl groups of less than 2.6, or less than 2.54, or less than 2.5, or less than 2.2 or less than 2 and a ratio of alpha carbons to the sum of ethyl and propyl groups of less than 2, or less than 1.4, or less than 1.38, or less than 1.3, or less than 1.1, or less than 1 or less than 0.9. Similarly the proportion of propyl and ethyl groups to total branch points is less than 0.41 for the reference/comparative bright stocks and at least 0.39, or at least 0.4, or at least 0.42, or at least 0.43, or at least 0.45, or at least 0.46 or at least 0.48 for the inventive bright stocks with the alpha carbons making up the remainder of branch points at a proportion of at least 0.59 for the reference/comparative bright stocks and less than 0.58, or less than 0.57, or less than 0.56, or less than 0.55 or less than 0.52 for the inventive bright stocks.

Another difference in the composition of the inventive bright stocks is the cycloparaffinic distribution as measured by FTICR-MS and/or FDMS, as shown in FIG. 10. These measurements indicate that the inventive bright stocks have a higher number of molecules with 2 rings: less than 18.01 per 100 molecules for the reference/comparative bright stocks and at least 17.0, or at least 18.01, or at least 18.5, or at least 19, or at least 20 (i.e., at least 20.0 molecules per 100 molecules of the composition), or at least 20.07 per 100 molecules for Samples A, B, and C. Molecules with 3 rings follow a similar trend with less than 19.7 per 100 molecules for the reference/comparative bright stocks and at least 19.7, or at least 20 (i.e., at least 20.0 molecules per 100 molecules of the composition), or at least 20.5 or at least 20.62 per 100 molecules for the inventive bright stocks. Molecules with 6, 7 or 8 rings follow the opposite trend with fewer of these molecules in the inventive bright stocks with at least 7.2 molecules with 6 rings per 100 molecules in the reference/comparative bright stocks, at least 4.8 molecules with 7 rings and at least 2.1 molecules with 8 rings. The inventive brighstocks have less than 7.1, or less than 7 (i.e., less than 7.0 molecules per 100 molecules of the composition), or less than 6.9 or less than 6.8 molecules with 6 rings per 100 molecules; less than 4.2, or less than 4 (i.e., less than 4.0 molecules per 100 molecules of the composition), or less than 3.8, or less than 3.6 or less than 3.3 molecules with 7 rings per 100 molecules; and less than 2 (i.e., less than 2.0 molecules per 100 molecules of the composition), or less than 1.9, or less than 1.8 or less than 1.5 molecules with 8 rings per 100 molecules. Additionally the inventive bright stocks have less than 1 (i.e., less than 1.0 molecules per 100 molecules of the composition), or less than 0.9, or less than 0.8, or less than 0.3 molecules with 9 rings per 100 molecules.

Molecules with fewer rings are favored in the inventive bright stocks when comparing the number of molecules with 5 or more, 6 or more, 7 or more and 11 or more rings. For example the reference/comparative bright stocks have at least 25.6, 14.9, 7.3 and 0.02 molecules with 5 or more, 6 or more, 7 or more and 11 or more rings per 100 molecules, respectively. The inventive bright stocks have less than 25.5, or less than 25, or less than 24.5, or less than 24, or less than 23 molecules with 5 or more rings per 100 molecules, less than 15, or less than 14.5, or less than 14, or less than 13, or less than 12 molecules with 6 or more rings per 100 molecules, less than 7.2, or less than 7, or less than 6.5, or less than 6, or less than 5 molecules with 7 or more rings per 100 molecules, and less than 0.02, or less than 0.01 or 0 molecules with 11 or more rings per 100 molecules. Additionally, when comparing the ratio of molecules with at least 5 rings to those with 2 rings, the reference/comparative bright stocks have a ratio of at least 1.5 whereas the inventive bright stocks have a ratio of less than 1.4, or less than 1.3, or less than 1.2. The inventive bright stocks also have smaller ratios of molecules with at least 6 rings and molecules with at least 7 rings to those with 2 rings: less than 0.9, or less than 0.8, or less than 0.7, or less than 0.6 for molecules with at least 6 rings compares to those with 2 and less than 0.4, or less than 0.3 for molecules with at least 7 rings to those with 2 rings.

The overall distribution of rings demonstrates that the inventive bright stocks favor molecules with fewer number of rings. The reference bright stocks have at least 0.05%, at least 0.08%, at least 2.22%, at least 6.14%, at least 16.6% and at least 32.2% molecules with at least 11, at least 10, at least 8, at least 7, at least 6 and at least 5 rings, respectively. The inventive bright stocks have less than 0.05, or less than 0.03 or 0 molecules per 100 with at least 11 rings, less than 0.08, or less than 0.07 or 0 molecules per 100 with at least 10 rings, less than 2.2, or less than 2.1, or less than 2, or less than 1.9 or less than 1.5, or less than 1 molecule(s) per 100 with at least 8 rings, less than 6.5, or less than 4.5, or less than 4, or less than 3, or less than 2 per 100 molecules with at least 7 rings, less than 16, or less than 15, or less than 14, or less than 13, or less than 12, or less than 11, or less than 10 per 100 molecules with at least 6 rings and less than 30, or less than 29, or less than 28, or less than 27 or less than 26, or less than 25 per 100 molecules with at least 5 rings. The reference/comparative brighstocks also have less than 70 per 100 molecules with 4 or fewer rings as compared to the inventive bright stocks which have at least 70, or at least 71, or at least 72 or at least 74 per 100 molecules with 4 or fewer rings. This lower number of large ring species seen in the composition is also reflected in the lower Conradson Carbon Residue (CCR) values for Samples A, B, and C in FIG. 9.

The distribution of number of rings in the inventive bright stocks favors a lower number of rings. For example, the ratio of 5 and 6 ring molecules compared to 2 and 3 ring molecules is greater than 0.7 for the reference/comparative bright stocks and less than 0.7, or less than 0.65 or less than 0.6 for the inventive bright stocks. The ratio of 2 and 3 ring molecules to molecules with 1 ring is also larger in the inventive bright stocks: less than 3.5 per 100 for the reference/comparative bright stocks and at least 3.5, or at least 4 per 100 for the inventive. Additionally, when comparing the ratio of molecules with at least 5 rings to those with 3 or few or to those with 4 or fewer, additional differences are observed. The reference/comparative bright stocks have a ratio of molecules with at least 5 rings to those with three or fewer of at least 0.57 and a ratio of molecules with at least 5 rings to those with 4 or fewer of less than 0.43. The inventive bright stocks have a ratio of molecules with at least 5 rings to those with 3 or fewer of less than 0.57, or less than 0.55 or less than 0.53 and a ratio of molecules with at least 5 rings to those with 4 or fewer of at least 0.43, or at least 0.4 or at least 0.38.

ADDITIONAL EMBODIMENTS

Embodiment 1

A method for making lubricant base stock, comprising: performing solvent deasphalting using a $C_4$ or $C_5$ solvent under effective solvent deasphalting conditions on a feedstock having a T5 boiling point of at least 370° C. (or at least 400° C., or at least 450° C., or at least 500° C.), the effective solvent deasphalting conditions producing a yield of deasphalted oil of at least about 50 wt % of the feedstock; hydroprocessing at least a portion of the deasphalted oil under first effective hydroprocessing conditions to form a hydroprocessed effluent having a sulfur content of 100 wppm or less and a nitrogen content of 100 wppm or less, the at least a portion of the deasphalted oil having an aromatics content of at least about 50 wt %; separating the hydroprocessed effluent to form at least a fuels boiling range fraction and a bottoms fraction; and hydroprocessing at least a portion of the hydroprocessed bottoms fraction under second effective hydroprocessing conditions, the second effective hydroprocessing conditions comprising catalytic dewaxing conditions, to form a catalytically dewaxed effluent; and at least one of a) solvent extracting at least a portion of the catalytically dewaxed effluent to form a solvent processed effluent, b) solvent dewaxing at least a portion of the catalytically dewaxed effluent to form a solvent processed effluent, wherein the catalytically dewaxed effluent is underdewaxed, wherein the solvent processed effluent comprises a 950° F.+ (510° C.+) portion having a VI of at least 80, a pour point of −6° C. or less, and a cloud point of −2° C. or less, the cloud point optionally being −5° C. or less.

Embodiment 2

The method of Embodiment 1, wherein at least a portion of the catalytically dewaxed effluent is solvent extracted, the solvent processed effluent comprising a 950° F.+ (510° C.+) portion having an aromatics content of less than 10 wt %, the solvent extracting optionally comprising solvent extracting with n-methylpyrrolidone, furfural, or a combination thereof.

Embodiment 3

The method of any of the above claims, wherein hydroprocessing at least a portion of the hydroprocessed bottoms fraction under second effective hydroprocessing conditions comprises hydrocracking the at least a portion of the hydroprocessed bottoms fraction under hydrocracking conditions to form a hydrocracked effluent, and catalytically dewaxing at least a portion of the hydrocracked effluent under the catalytic dewaxing conditions to form a second hydroprocessing effluent comprising the catalytically dewaxed effluent.

Embodiment 4

The method of Embodiment 3, hydroprocessing at least a portion of the hydroprocessed bottoms fraction under second effective hydroprocessing conditions further comprises performing aromatic saturation on the catalytically dewaxed effluent prior to the at least one of solvent extracting and solvent dewaxing.

Embodiment 5

The method of any of the above embodiments, wherein at least a portion of the catalytically dewaxed effluent is solvent dewaxed, the first effective hydroprocessing conditions comprising conditions for conversion of 10 wt % to 40 wt % of the deasphalted oil relative to a conversion temperature of 510° C., the catalytically dewaxed effluent optionally having a wax content of at least 6 w t %, or at least 8 wt %, or at least 10 wt %, or at least 12 wt %, the solvent processed effluent optionally having a wax content of at least 4 wt %, or at least 6 wt %.

Embodiment 6

A method for making lubricant base stock, comprising: performing solvent deasphalting using a $C_{4+}$ solvent (or $C_{5+}$ solvent) under effective solvent deasphalting conditions on a feedstock having a T5 boiling point of at least 370° C. (or at least 400° C., or at least 450° C., or at least 500° C.), the effective solvent deasphalting conditions producing a yield of deasphalted oil of at least about 50 wt % of the feedstock; hydroprocessing at least a portion of the deasphalted oil under first effective hydroprocessing conditions to form a hydroprocessed effluent having a CCR content of 1 wt % or less, a sulfur content of 100 wppm or less, and a nitrogen content of 100 wppm or less, the at least a portion of the deasphalted oil having an aromatics content of at least about 50 wt %, separating the hydroprocessed effluent to form at least a fuels boiling range fraction and a bottoms fraction; and solvent dewaxing at least a portion of the hydroprocessed bottoms fraction to form a solvent dewaxed effluent comprising a 950° F.+ (510° C.+) portion having a VI of at least 80, a pour point of −6° C. or less, and a cloud point of −2° C. or less.

Embodiment 7

The method of any of the above embodiments, wherein the 950° F.+(510° C.+) portion has a difference between a cloud point temperature and a pour point temperature of 15° C. or less, or 10° C. or less, or 6° C. or less.

Embodiment 8

The method of any of the above embodiments, wherein hydroprocessing at least a portion of the deasphalted oil comprises hydrotreating the at least a portion of the deasphalted oil, hydrocracking the at least a portion of the deasphalted oil, or a combination thereof.

Embodiment 9

The method of any of the above embodiments, wherein the yield of deasphalted oil is at least 55 wt %, or at least 60 wt %, or at least 65 wt %, or at least 70 wt %, or at least 75 wt %, or wherein performing solvent deasphalting comprises a deasphalting temperature of less than 190° C., or a combination thereof.

Embodiment 10

The method of any of the above embodiments, wherein the $C_{4+}$ solvent or the $C_4$-$C_5$ solvent comprises a mixture of two or more $C_5$ isomers.

Embodiment 11

The method of any of the above embodiments, wherein the deasphalted oil has an aromatics content of at least 55 wt %, or at least 60 wt %, or at least 65 wt %, or at least 70 wt % based on a weight of the deasphalted oil.

Embodiment 12

The method of any of the above embodiments, wherein the solvent dewaxed effluent or the solvent processed effluent has a pour point of −10° C. or less, or −15° C. or less; or wherein the solvent dewaxed effluent or the solvent processed effluent has a cloud point of −5° C. or less, or −10° C. or less; or a combination thereof.

Embodiment 13

The method of any of the above embodiments, wherein the 950° F.+(510° C.+) portion of the solvent dewaxed effluent or the solvent processed effluent has a pour point of −10° C. or less, or −15° C. or less; or wherein the 950° F.+ portion of the solvent dewaxed effluent or the solvent processed effluent has a cloud point of −5° C. or less, or −10° C. or less; or a combination thereof.

Embodiment 14

The method of any of the above embodiments, wherein the solvent dewaxed effluent or the solvent processed effluent has a VI of at least 90, or at least 95, or at least 100, or wherein the 950° F.+ (510° C.+) portion of the solvent dewaxed effluent has a VI of at least 90, or at least 95, or at least 100, or a combination thereof.

Embodiment 15

The method of any of the above embodiments, wherein hydroprocessing at least a portion of the deasphalted oil further comprises hydroprocessing a vacuum gas oil boiling range feed.

Embodiment 16

The method of any of the above embodiments, wherein the solvent deasphalting further produces a residual rock portion, the residual rock portion optionally being i) used as a blend component to produce at least one of asphalt and fuel oil, ii) used as feed to a gasification process, the gasification process optionally comprising partial oxidation, fluid bed combustion, coking, or a combination thereof, or iii) a combination of i) and ii).

Embodiment 17

The method of any of the above embodiments, further comprising adding 0.1 wt % to 2.5 wt % of an additive to solvent processed effluent, the additive comprising a Group I bright stock, an alkylated naphthalene, or a combination thereof.

Embodiment 18

A solvent processed effluent produced according to any of Embodiments 1-17.

Embodiment 19

A bright stock formed from the solvent processed effluent of Embodiment 18, the bright stock optionally being a Group II bright stock.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for making lubricant base stock, comprising:
performing solvent deasphalting using a $C_4$ or $C_5$ solvent under effective solvent deasphalting conditions on a feedstock having a T5 boiling point of at least 370° C., the effective solvent deasphalting conditions producing a yield of $C_4$ or $C_5$ deasphalted oil of at least about 50 wt% of the feedstock;
selecting first effective hydroprocessing conditions to hydroprocess a $C_4$ or $C_5$ deasphalted oil;
hydroprocessing at least a portion of the $C_4$ or $C_5$ deasphalted oil under first effective hydroprocessing conditions to form a hydroprocessed effluent having a sulfur content of 100 wppm or less and a nitrogen content of 100 wppm or less comprising a first amount of conversion of the at least a portion of the $C_4$ or $C_5$ deasphalted oil relative to 370° C., the at least a portion of the $C_4$ or $C_5$ deasphalted oil having an aromatics content of at least about 50 wt%, the first effective hydroprocessing conditions comprising exposing the $C_4$ or $C_5$ deasphalted oil to a supported catalyst, the supported catalyst comprising a zeolitic support;
separating the hydroprocessed effluent to form at least a fuels boiling range fraction and a hydroprocessed bottoms fraction;
hydroprocessing at least a portion of the hydroprocessed bottoms fraction under second effective hydroprocessing conditions, the second effective hydroprocessing conditions comprising:
hydrocracking the at least a portion of the hydroprocessed bottoms fraction under hydrocracking conditions to form a hydrocracked effluent,
catalytically dewaxing at least a portion of the hydrocracked effluent under catalytic dewaxing conditions comprising a second amount of conversion of the at least a portion of the $C_4$ or $C_5$ deasphalted oil relative to 370° C. to form a second hydroprocessing effluent comprising a catalytically dewaxed effluent, and
performing aromatic saturation on the catalytically dewaxed effluent prior to solvent extracting; and
solvent extracting at least a portion of the catalytically dewaxed effluent to form a solvent processed effluent, wherein the solvent processed effluent comprises a 950° F.+(510° C.+) portion having a kinematic viscosity at 100° C. of 30 cSt or more, a viscosity index (VI) of at least 80, a pour point of −6° C. or less, and a cloud point of −2° C. or less.

2. The method of claim 1, wherein at least a portion of the catalytically dewaxed effluent is solvent extracted, the solvent processed effluent comprising a 950° F.+(510° C.+) portion having an aromatics content of less than 10 wt%.

3. The method of claim 2, wherein the solvent extracting comprises solvent extracting with n-methylpyrrolidone, furfural, or a combination thereof.

4. The method of claim 1, wherein the 950° F.+(510° C.+) portion of the solvent processed effluent has a pour point of −10° C. or less; or wherein the 950° F.+(510° C.+) portion of the solvent processed effluent has a cloud point of −10° C. or less; or a combination thereof.

5. The method of claim 1, wherein the 950° F.+ (510° C.+) portion of the solvent processed effluent has a VI of at least 90.

6. The method of claim 1, wherein at least a portion of the catalytically dewaxed effluent is solvent dewaxed, the first effective hydroprocessing conditions comprising conditions for conversion of 10 wt% to 40 wt% of the $C_4$ or $C_5$ deasphalted oil relative to a conversion temperature of 510° C.

7. The method of claim 6, wherein the catalytically dewaxed effluent has a wax content of at least 6 wt%.

8. The method of claim 6, wherein the solvent processed effluent has a wax content of at least 4 wt%.

9. The method of claim 1, further comprising adding 0.1 wt% to 2.5 wt% of an additive to solvent processed effluent, the additive comprising a Group I bright stock, an alkylated naphthalene, or a combination thereof.

10. The method of claim 1, wherein the solvent deasphalting further produces a residual rock portion.

11. The method of claim 10, further comprising using the residual rock portion as a blend component to produce at least one of asphalt and fuel oil.

12. The method of claim 10, further comprising using the residual rock portion as feed to a gasification process, the gasification process optionally comprising partial oxidation, fluid bed combustion, coking, or a combination thereof.

13. A method for making lubricant base stock, comprising:
performing solvent deasphalting using a $C_{4+}$ solvent under effective solvent deasphalting conditions on a feedstock having a T5 boiling point of at least 370° C., the effective solvent deasphalting conditions producing a yield of $C_{4+}$ deasphalted oil of at least about 50 wt% of the feedstock;
selecting first effective hydroprocessing conditions to hydroprocess the $C_{4+}$ deasphalted oil;
hydroprocessing at least a portion of the $C_{4+}$ deasphalted oil under first effective hydroprocessing conditions to form a hydroprocessed effluent having a CCR content of 1 wt% or less, a sulfur content of 100 wppm or less, and a nitrogen content of 100 wppm or less comprising a first amount of conversion of the at least a portion of the $C_{4+}$ deasphalted oil relative to 370° C., the at least a portion of the $C_{4+}$ deasphalted oil having an aromatics content of at least about 50 wt%, the first effective hydroprocessing conditions comprising exposing the $C_{4+}$ deasphalted oil to a supported catalyst, the supported catalyst comprising a zeolitic support;
separating the hydroprocessed effluent to form at least a fuels boiling range fraction and a hydroprocessed bottoms fraction;
hydroprocessing at least a portion of the hydroprocessed bottoms fraction under second effective hydroprocessing conditions, the second effective hydroprocessing conditions comprising:
hydrocracking the at least a portion of the hydroprocessed bottoms fraction under hydrocracking conditions to form a hydrocracked effluent,
catalytically dewaxing at least a portion of the hydrocracked effluent under catalytic dewaxing conditions comprising a second amount of conversion of the at least a portion of the $C_{4+}$ deasphalted oil relative to 370°C. to form a second hydroprocessing effluent comprising a catalytically dewaxed effluent, and
performing aromatic saturation on the catalytically dewaxed effluent prior to solvent dewaxing; and
solvent dewaxing at least a portion of the hydroprocessed bottoms fraction to form a solvent dewaxed effluent, the solvent dewaxed effluent comprising a 950° F.+ (510° C.+) portion having a kinematic viscosity at 100° C. of 30 cSt or more, a viscosity index (VI) of at least 80, a pour point of −6° C. or less, and a cloud point of −2° C. or less.

14. The method of claim 13, wherein the 950° F.+(510° C.+) portion has a difference between a cloud point temperature and a pour point temperature of 15° C. or less.

15. The method of claim 13, wherein hydroprocessing at least a portion of the $C_{4+}$ deasphalted oil comprises hydrotreating the at least a portion of the $C_{4+}$ deasphalted oil, hydrocracking the at least a portion of the $C_{4+}$ deasphalted oil, or a combination thereof.

16. The method of claim 13, wherein the yield of $C_{4+}$ deasphalted oil is at least 55 wt%.

17. The method of claim 13, wherein the $C_{4+}$ solvent comprises a mixture of two or more $C_5$ isomers.

18. The method of claim 13, wherein performing solvent deasphalting comprises a deasphalting temperature of less than 190° C.

19. The method of claim 13, wherein the $C_{4+}$ deasphalted oil has an aromatics content of at least 55 wt% based on a weight of the $C_{4+}$ deasphalted oil.

20. The method of claim 13, wherein the solvent dewaxed effluent has a pour point of −10° C. or less; or wherein the solvent dewaxed effluent has a cloud point of −5° C. or less; or a combination thereof.

21. The method of claim 13, wherein the 950° F.+ (510° C.+) portion of the solvent dewaxed effluent has a pour point of −10° C. or less; or wherein the 950° F.+ portion of the solvent dewaxed effluent has a cloud point of −5° C. or less; or a combination thereof.

22. The method of claim 13, wherein the solvent dewaxed effluent has a VI of at least 90.

23. The method of claim 13, wherein the 950° F.+ (510° C.+) portion of the solvent dewaxed effluent has a VI of at least 90.

24. The method of claim 13, wherein hydroprocessing at least a portion of the $C_{4+}$ deasphalted oil further comprises hydroprocessing a vacuum gas oil boiling range feed.

25. A method for making a haze free bright stock, comprising:

performing solvent deasphalting using a $C_4$ or $C_5$ solvent under effective solvent deasphalting conditions on a feedstock having a T5 boiling point of at least 370° C., the effective solvent deasphalting conditions producing a yield of $C_4$ or $C_5$ deasphalted oil of at least about 50 wt% of the feedstock;

selecting first effective hydroprocessing conditions to hydroprocess a $C_4$ or $C_5$ deasphalted oil;

hydroprocessing at least a portion of the $C_4$ or $C_5$ deasphalted oil under first effective hydroprocessing conditions to form a hydroprocessed effluent having a sulfur content of 100 wppm or less and a nitrogen content of 100 wppm or less comprising a first amount of conversion of the at least a portion of the $C_4$ or $C_5$ deasphalted oil relative to 370° C., the at least a portion of the $C_4$ or $C_5$ deasphalted oil having an aromatics content of at least about 50 wt%, the first effective hydroprocessing conditions comprising exposing the $C_4$ or $C_5$ deasphalted oil to a supported catalyst, the supported catalyst comprising a zeolitic support;

separating the hydroprocessed effluent to form at least a fuels boiling range fraction and a hydroprocessed bottoms fraction;

hydroprocessing at least a portion of the hydroprocessed bottoms fraction under second effective hydroprocessing conditions, the second effective hydroprocessing conditions comprising:

hydrocracking the at least a portion of the hydroprocessed bottoms fraction under hydrocracking conditions to form a hydrocracked effluent, catalytically dewaxing at least a portion of the hydrocracked effluent under catalytic dewaxing conditions comprising a second amount of conversion of the at least a portion of the $C_4$ or $C_5$ deasphalted oil relative to 370° C., to form a second hydroprocessing effluent comprising a catalytically dewaxed effluent, and performing aromatic saturation on the catalytically dewaxed effluent prior to solvent extracting; and solvent extracting at least a portion of the catalytically dewaxed effluent to form a solvent processed effluent, wherein the solvent processed effluent comprises a haze free bright stock having a kinematic viscosity at 100° C. of 30 cSt or more, a viscosity index (VI) of at least 80, a pour point of −6° C. or less, and a cloud point of −2° C. or less.

* * * * *